(12) United States Patent
Kinzinger

(10) Patent No.: US 12,474,930 B2
(45) Date of Patent: Nov. 18, 2025

(54) METHOD OF INTERLEAVED PROCESSING ON A GENERAL-PURPOSE COMPUTING CORE

(71) Applicant: Kinzinger Automation GmbH, Rastatt (DE)

(72) Inventor: Klaus Kinzinger, Rastatt (DE)

(73) Assignee: Kinzinger Automation GmbH, Rastatt (DE)

( * ) Notice: Subject to any disclaimer, the term of this patent is extended or adjusted under 35 U.S.C. 154(b) by 0 days.

(21) Appl. No.: 18/025,909

(22) PCT Filed: Sep. 12, 2020

(86) PCT No.: PCT/EP2020/075579
§ 371 (c)(1),
(2) Date: Mar. 12, 2023

(87) PCT Pub. No.: WO2022/053152
PCT Pub. Date: Mar. 17, 2022

(65) Prior Publication Data
US 2023/0367604 A1 Nov. 16, 2023

(51) Int. Cl.
*G06F 9/38* (2018.01)
*G06F 15/78* (2006.01)

(52) U.S. Cl.
CPC .......... *G06F 9/3895* (2013.01); *G06F 9/3851* (2013.01); *G06F 9/3888* (2023.08); *G06F 15/7857* (2013.01)

(58) Field of Classification Search
CPC .......................... G06F 9/3875; G06F 15/7857
See application file for complete search history.

(56) References Cited

U.S. PATENT DOCUMENTS

| | | | | |
|---|---|---|---|---|
| 5,805,850 A | * | 9/1998 | Luick | G06F 9/30145 712/E9.05 |
| 5,974,537 A | * | 10/1999 | Mehra | G06F 9/3853 712/E9.05 |
| 6,044,451 A | * | 3/2000 | Slavenburg | G06F 9/3836 712/E9.071 |
| 9,886,275 B1 | * | 2/2018 | Carlson | G06F 13/00 |
| 2020/0241879 A1 | * | 7/2020 | Vorbach | G06F 9/3012 |

* cited by examiner

*Primary Examiner* — Jacob Petranek
(74) *Attorney, Agent, or Firm* — Hansen IP Law PLLC

(57) ABSTRACT

A method of "interleaved processing" (IP) is proposed which generalizes the functional principle of memory interleaving by extending the interleaved memory system into the processor chip and prepending each write access to one of the extended interleaved memory banks by a data transforming operation. The method opens a new dimension of large scale software parallelization and is implemented in autonomous processing units called "parallel processing channels" (PPC) that integrate processor and memory at a very low machine balance—which solves the memory wall problem—and execute on-chip machine transactions at a 1 Flop/cycle throughput. If computing systems are linearly performance scalable and capable of pipelined execution of very large and complex HPC workloads. They have unique performance advantages in strided vector, tensor, and data set operations; for relevant HPC workload types, up to 10×-100× per-Watt single-processor performance gains compared to today's technologies are expected.

23 Claims, 32 Drawing Sheets

FIG 1

PRIOR ART

Today's Top 25 Supercomputers and Evaluations

|  | Name | Computing Cores | Power [kW] | HPL [TFlop/s] | HPCG [TFlop/s] | eval A Power / Core [W] | eval B HPL [pJ/Flop] | eval C HPCG [pJ/Flop] | eval D Machine Balance [Flop/B] |
|---|---|---|---|---|---|---|---|---|---|
| 1 | Fugaku | 7,299,072 | 28,335 | 415,530 | 13,366 | 3.9 | 68 | 2,120 | 7.5 |
| 2 | Summit | 2,414,592 | 10,096 | 148,600 | 2,926 | 4.2 | 68 | 3,451 | 12.2 |
| 3 | Sierra | 1,572,480 | 7,438 | 94,640 | 1,796 | 4.7 | 79 | 4,142 | 12.7 |
| 4 | Sunway Taihu | 10,649,600 | 15,371 | 93,015 | 481 | 1.4 | 165 | 31,966 | 46.6 |
| 5 | Tianhe-2A | 4,981,760 | 18,482 | 61,445 | - | 3.7 | 301 | - | - |
| 6 | HPC5 | 669,760 | 2,252 | 35,450 | 860 | 3.4 | 64 | 2,618 | 9.9 |
| 7 | Selene | 272,800 | 1,344 | 27,580 | 509 | 4.9 | 49 | 2,639 | 13.1 |
| 8 | Frontera | 448,448 | - | 23,516 | - | - | - | - | - |
| 9 | Marconi-100 | 347,776 | 1,476 | 21,640 | - | 4.2 | 68 | - | - |
| 10 | Piz Daint | 387,872 | 2,384 | 21,230 | 497 | 6.1 | 112 | 4,797 | 10.3 |
| 11 | Trinity | 979,072 | 7,578 | 20,159 | 546 | 7.7 | 376 | 13,876 | 8.9 |
| 12 | AI Bridging Cloud | 391,680 | 1,649 | 19,880 | 509 | 4.2 | 83 | 3,241 | 9.4 |
| 13 | SuperMUC-NG | 305,856 | - | 19,477 | 208 | - | - | - | 22.6 |
| 14 | Lassen | 288,288 | - | 18,200 | - | - | - | - | - |
| 15 | PANGEA III | 291,024 | 1,367 | 17,860 | - | 4.7 | 77 | - | - |
| 16 | Cori | 622,336 | 3,939 | 14,015 | 355 | 6.3 | 281 | 11,082 | 9.5 |
| 17 | Nurion | 570,020 | - | 13,929 | 391 | - | - | - | 8.6 |
| 18 | Oakforest-PACS | 556,104 | 2,719 | 13,555 | 385 | 4.9 | 201 | 7,053 | 8.5 |
| 19 | HPC4 | 253,600 | 1,320 | 12,210 | 272 | 5.2 | 108 | 4,855 | 10.8 |
| 20 | Tera-1000-2 | 561,408 | 3,178 | 11,966 | 334 | 5.7 | 266 | 9,522 | 8.6 |
| 21 | Stampede2 | 367,024 | - | 10,681 | - | - | - | - | - |
| 22 | Marconi Intel ... | 348,000 | - | 10,385 | 69 | - | - | - | 36.5 |
| 23 | DGX SuperPOD | 127,488 | - | 9,444 | 199 | - | - | - | 11.4 |
| 24 | Gadi | 204,032 | - | 9,264 | - | - | - | - | - |
| 25 | Taiwania 2 | 170,352 | 798 | 9,000 | - | 4.7 | 89 | - | - |
|  |  |  |  |  | Min: | 1.4 | 49 | 2,120 | 7.5 |
|  |  |  |  |  | Max: | 7.7 | 376 | 31,966 | 46.6 |
|  |  |  |  |  | Median: | 4.7 | 89 | 4,797 | 10.3 |

PRIOR ART vs. The Invention
Performance Rooflines – Scaled up to 20 MW Power Consumption

|  | Power [MW] | Cores [million] | Rpeak [PFlop/s] | Bandwidth [PB/s] | Memory [PB] | Energy [pJ/Flop] | MB [Flop/B] | General Purpose |
|---|---|---|---|---|---|---|---|---|
| The Invention | 20 | 16.1 | 1,000 | 3,125 | 65 | 20 | 0.3 | yes |
| GPU (Tesla V100) | 20 | 5.3 | 519 | 60 | 2.1 | 38 | 8.7 | no |
| CPU (Fujitsu A64FX) | 20 | 5.2 | 363 | 110 | 3.4 | 55 | 3.3 | yes |
| CPU (AMD Epyc) | 20 | 4.6 | 190 | 14 | 293 | 105 | 14.0 | yes |

PRIOR ART vs. The Invention

Read-Outs of FIG 2 for Selected Relevant HPC Workloads

|  | HPCG [PFlop/s] | 7 pt Stencil [PFlop/s] | CFD [PFlop/s] | NWP [PFlop/s] | 27 pt Stencil [PFlop/s] | CP2k [PFlop/s] | Rpeak [PFlop/s] |
|---|---|---|---|---|---|---|---|
| AI (approx) | 0.24 | 0.25 | 0.5 | 0.5 - 1.5 | 1.9 | 2.8 | > 16 |
| *The Invention* | *753* | *781* | *1,000* | *1,000* | *1,000* | *1,000* | *1,000* |
| CPU (Fujitsu A64FX) | 26.5 | 27.5 | 55 | 55 - 165 | 209 | 308 | 363 |
| GPU (Tesla V100) | 14.4 | 15.0 | 30 | 30 - 90 | 114 | 168 | 519 |
| CPU (AMD Epyc) | 3.3 | 3.4 | 6.8 | 6.8 - 20 | 26 | 38 | 190 |

Design of a Parallel Processing Channel (PPC)

Performance Scalability – Rooflines of Various IP Cores

FIG 9

The IP Cores of FIG 8: Expected Data

| # | Category / Application | Clock [GHz] | PPCs per Core | Bitlanes per PPC | Rpeak [GFlop/s] | Bandwidth [GB/s] | MB [Flop/B] | Power [W] |
|---|---|---|---|---|---|---|---|---|
| 80 | Future HPC / Data Center | 2 | 257 | 1 | 514 | 1,606 | 0.32 | 10.28 |
| 81 | Future HPC / Data Center | 2 | 127 | 1 | 254 | 794 | 0.32 | 5.08 |
| 82 | HPC / Data Center, low MB | 2 | 31 | 2 | 62 | 388 | 0.16 | 1.24 |
| 83 | HPC / Data Center / AI / AV | 2 | 31 | 1 | 62 | 194 | 0.32 | 1.24 |
| 84 | Server / AI / AV | 2 | 17 | 1 | 34 | 106 | 0.32 | 0.68 |
| 85 | PC, Cell Phone | 2 | 7 | 1 | 14 | 44 | 0.32 | 0.28 |
| 86 | Microcontroller | 2 | 3 | 1 | 6 | 19 | 0.32 | 0.12 |
| 87 | Microcontroller | 2 | 1 | 1 | 2 | 6 | 0.32 | 0.04 |
| 88 | Fujitsu A64FX core | (vector processing mode) | | | 70 | 21 | 3.30 | 3.88 |

FIG 10

Interleaved Processing is based on Memory Word Interleaving:

Mapping of the Logical Address Space to the Physical PPC Memory Set (74)

in a Core (83) with m = 31 PPCs

| b = adr mod m | | a = adr / m | | | | | |
|---|---|---|---|---|---|---|---|
| | | a = 0 | a = 1 | a = 2 | a = 3 | a = 4 | ... |
| b = 0  selects: | PPC0 | 0 | 31 | 62 | 93 | 124 | ... |
| b = 1  selects: | PPC1 | 1 | 32 | 63 | 94 | 125 | ... |
| b = 2  selects: | PPC2 | 2 | 33 | 64 | 95 | 126 | ... |
| b = 3  selects: | PPC3 | 3 | 34 | 65 | 96 | 127 | ... |
| b = 4  selects: | PPC4 | 4 | 35 | 66 | 97 | 128 | ... |
| b = 5  selects: | PPC5 | 5 | 36 | 67 | 98 | 129 | ... |
| b = 6  selects: | PPC6 | 6 | 37 | 68 | 99 | 130 | ... |
| b = 7  selects: | PPC7 | 7 | 38 | 69 | 100 | 131 | ... |
| b = 8  selects: | PPC8 | 8 | 39 | 70 | 101 | 132 | ... |
| b = 9  selects: | PPC9 | 9 | 40 | 71 | 102 | 133 | ... |
| b = 10  selects: | PPC10 | 10 | 41 | 72 | 103 | 134 | ... |
| b = 11  selects: | PPC11 | 11 | 42 | 73 | 104 | 135 | ... |

... and so on ...

| b = 25  selects: | PPC25 | 25 | 56 | 87 | 118 | 149 | ... |
|---|---|---|---|---|---|---|---|
| b = 26  selects: | PPC26 | 26 | 57 | 88 | 119 | 150 | ... |
| b = 27  selects: | PPC27 | 27 | 58 | 89 | 120 | 151 | ... |
| b = 28  selects: | PPC28 | 28 | 59 | 90 | 121 | 152 | ... |
| b = 29  selects: | PPC29 | 29 | 60 | 91 | 122 | 153 | ... |
| b = 30  selects: | PPC30 | 30 | 61 | 92 | 123 | 154 | ... |

Addition of Unit Stride Vectors
– Dense PPC Port Usage of the IP Core (83) –

Addition of Strided Vectors
– Dense PPC Port Usage of the IP Core (83) –

Aliasing Effects Caused by a Non-Prime PPC Count m = 32

– Performance Drops of the Strided Vector Addition of FIG 12 –

Aliasing Effects Caused by a Prime PPC Count m = 31

– Performance Drops of the Strided Vector Addition of FIG 12 –

PRIOR ART: Data of the Numerical Operations in FIG 17 *(Intel Xeon)*

|  | latency [cycle] | throughput [Flop/cycle] | count [ops] | |
|---|---|---|---|---|
| vector read | 3 | 2 | 3 | 5 memory operations |
| vector write | 3 | 1 | 2 | |
| neg | 1 | 1 | 1 | |
| add/sub | 3 | 1 | 3 | |
| mult | 5 | 1 | 4 | 11 numeric operations |
| div | 16 | 1/5 | 2 | |
| sqrt | 21 | 1/7 | 1 | |

Memory Abstraction Layers

FIG 20

Pipelined Memory

– The Functioning of one Buffer Pipeline (FIFO) within FIG 17 –

|  |  | stage | 8 | 9 | 10 | 11 | 12 |
|---|---|---|---|---|---|---|---|
|  |  | iteration | 1000 | 1001 | 1002 | 1003 | 1004 |
| mult writes |  |  |  |  |  |  |  |
|  | latch |  | 44 | 44 | 44 | 44 | 44 |
|  | address |  | 20 | 21 | 22 | 23 | 24 |
| mult output pipeline |  |  |  |  |  |  |  |
|  | latch |  | 44 | 43 | 42 | 41 | 40 |
|  | address |  | 20 | 20 | 20 | 20 | 20 |
| sub reads |  |  |  |  |  |  |  |
|  | latch |  | 40 | 40 | 40 | 40 | 40 |
|  | address |  | 16 | 17 | 18 | 19 | 20 |

Preliminary Draft of an ESC Encoding Scheme

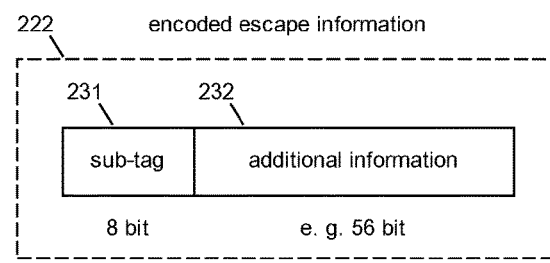

| | Meaning | Sub-Tag | Additional Information |
|---|---|---|---|
| CALL | Start of pipelined subroutine call | 00000000 | <caller ID, call number> |
| LINK | Specifies a dynamic channel; connects the callee to a consignee (destination pipeline) | 00000001 | <output channel #, destination pipeline ID, dest. input channel #> |
| RET | End of pipelined subroutine call | 00000010 | <caller ID, call number> |
| ACK | Acknowledge | 00000011 | <various> |
| WAVE | Used for parallel conditional statements (if-else, switch). Identifies individual wavefronts. Used to re-sequentialize wavefronts that have taken paths of different latencies. | 00000100 | <wavefront number> <caller ID, call number> |
| SOT | Start of transmission | 00000101 | <transmission number> |
| EOT | End of transmission; drains a pipeline | 00000110 | <transmission number> |
| SOP | Start of data packet | 00000111 | <data packet number> |
| EOP | End of data packet; if configured so: drains a pipeline | 00001000 | <data packet number> |
| TRAP | Exception | 00001001 | <exception number> |
| TIME | Time stamp of data packet | 00001010 | <time stamp> |
| ... | ... more protocol options | ... | ... |

FIG 24

Scheduling of a Pipelined Conditional Loop:
– Gapless Processing and Reordering of the Wavefront Sequence –

| section | wavefront input | 0 | 1 | 2 | 3 | 4 | 5 | wavefront output | iterations |
|---|---|---|---|---|---|---|---|---|---|
| prolog | 1 | 1 | | | | | | | |
| | 2 | 2 | 1 | | | | | | |
| | 3 | 3 | 2 | 1 | | | | | |
| | 4 | 4 | 3 | 2 | 1 | | | | |
| | 5 | 5 | 4 | 3 | 2 | 1 | | | |
| | 6 | 6 | 5 | 4 | 3 | 2 | 1 | | |
| | 7 | 7 | 6 | 5 | 4 | 3 | 2 | 1 | * |
| | feed-back | 2 | 7 | 6 | 5 | 4 | 3 | | |
| | 8 | 8 | 2 | 7 | 6 | 5 | 4 | 3 | * |
| | 9 | 9 | 8 | 2 | 7 | 6 | 5 | 4 | * |
| | 10 | 10 | 9 | 8 | 2 | 7 | 6 | 5 | * |
| | feed-back | 6 | 10 | 9 | 8 | 2 | 7 | | |
| | feed-back | 7 | 6 | 10 | 9 | 8 | 2 | | |
| | feed-back | 2 | 7 | 6 | 10 | 9 | 8 | | |
| | 11 | 11 | 2 | 7 | 6 | 10 | 9 | 8 | * |
| | feed-back | 9 | 11 | 2 | 7 | 6 | 10 | | |
| | 12 | 12 | 9 | 11 | 2 | 7 | 6 | 10 | * |
| | 13 | 13 | 12 | 9 | 11 | 2 | 7 | 6 | ** |
| | feed-back | 7 | 13 | 12 | 9 | 11 | 2 | | |
| | feed-back | 2 | 7 | 13 | 12 | 9 | 11 | | |
| | 14 | 14 | 2 | 7 | 13 | 12 | 9 | 11 | * |
| | 15 | 15 | 14 | 2 | 7 | 13 | 12 | 9 | ** |
| | feed-back | 12 | 15 | 14 | 2 | 7 | 13 | | |
| steady state | feed-back | 13 | 12 | 15 | 14 | 2 | 7 | | |
| | 16 | 16 | 13 | 12 | 15 | 14 | 2 | 7 | *** |
| | feed-back | 2 | 16 | 13 | 12 | 15 | 14 | | |
| | 17 | 17 | 2 | 16 | 13 | 12 | 15 | 14 | * |
| | 18 | 18 | 17 | 2 | 16 | 13 | 12 | 15 | * |
| | feed-back | 12 | 18 | 17 | 2 | 16 | 13 | | |
| | feed-back | 13 | 12 | 18 | 17 | 2 | 16 | | |
| | 19 | 19 | 13 | 12 | 18 | 17 | 2 | 16 | * |
| | feed-back | 2 | 19 | 13 | 12 | 18 | 17 | | |
| | 20 | 20 | 2 | 19 | 13 | 12 | 18 | 17 | * |
| | feed-back | 18 | 20 | 2 | 19 | 13 | 12 | | |
| | feed-back | 12 | 18 | 20 | 2 | 19 | 13 | | |
| | 21 | 21 | 12 | 18 | 20 | 2 | 19 | 13 | *** |
| | feed-back | 19 | 21 | 12 | 18 | 20 | 2 | | |
| | 22 | 22 | 19 | 21 | 12 | 18 | 20 | 2 | ****** |
| | feed-back | 20 | 22 | 19 | 21 | 12 | 18 | | |
| | 23 | 23 | 20 | 22 | 19 | 21 | 12 | 18 | ** |
| | feed-back | 12 | 23 | 20 | 22 | 19 | 21 | | |
| | 24 | 24 | 12 | 23 | 20 | 22 | 19 | 21 | * |

IP Superpipeline of a Parallel Subroutine Call

IP Superpipeline of a Parallel If-Else Statement

FIG 29

IP Core Operational Modes

– PRIOR ART Coverage –

| mode | PRIOR ART equivalent | operation type | operand type | VLIW generation |
|---|---|---|---|---|
| GPP | CPU (general purpose) | EPIC scalar (latency-bound) | scalar data (irregular access) | compiler (EPIC) |
| SIMD | GPU, vector unit (accelerator) | IPIC vector, tensor (latency bound) | vector, data base (regular access) | hardware (control unit) |
| VHTC | FPGA, ASIC (accelerator) | EPIC pipeline (throughput-bound) | scalar data (irregular access) | compiler (EPIC) |

Scheduling – Necessary ALU Jitter

For an Exemplary Gapless Transaction Sequence (cf. FIG 18)

| cycle | issue | latency | delay (jitter) | write cycle | write |
|---|---|---|---|---|---|
| 1 | mult | 5 | | 6 | |
| 2 | sqrt | 21 | | 23 | |
| 3 | neg | 1 | | 4 | |
| 4 | mult | 5 | | 9 | neg |
| 5 | neg | 1 | 1 | 7 | |
| 6 | div | 16 | | 22 | mult |
| 7 | div | 16 | 1 | 24 | neg |
| 8 | neg | 1 | 1 | 10 | |
| 9 | add | 3 | | 12 | mult |
| 10 | sqrt | 21 | | 31 | neg |
| 11 | div | 16 | | 27 | |
| 12 | add | 3 | | 15 | add |
| 13 | sqrt | 21 | | 34 | |
| 14 | add | 3 | | 17 | |
| 15 | neg | 1 | | 16 | add |
| 16 | sqrt | 21 | | 37 | neg |
| 17 | div | 16 | | 33 | add |
| 18 | div | 16 | 1 | 35 | |
| 19 | sqrt | 21 | | 40 | |
| 20 | add | 3 | 2 | 25 | |
| 21 | sqrt | 21 | | 42 | |
| 22 | neg | 1 | 3 | 26 | div |
| 23 | mult | 5 | | 28 | sqrt |
| 24 | neg | 1 | 4 | 29 | div |
| 25 | mult | 5 | | 30 | add |
| 26 | neg | 1 | 5 | 32 | neg |
| 27 | add | 3 | 6 | 36 | div |
| 28 | div | 16 | | 44 | mult |
| 29 | div | 16 | | 45 | neg |
| 30 | sqrt | 21 | | 51 | mult |
| 31 | neg | 1 | 6 | 38 | sqrt |
| 32 | div | 16 | | 48 | neg |
| 33 | mult | 5 | 1 | 39 | div |
| 34 | div | 16 | | 50 | sqrt |
| 35 | add | 3 | 3 | 41 | div |
| 36 | mult | 5 | 2 | 43 | add |
| ... | ... | | | | ... |

FIG 33

Compiled DFG of FIG 16

(VLIW Assembler Code Implementing the Timing Diagram of FIG 17)

| opcode | VLIW | comment |
|---|---|---|
| 0 | move [0s]++, 32p | read *a into latch 32; post-increment pointer to a (in stackpos 0) |
| 1 | move [2s]++, 35p | read *c into latch 35; post-increment pointer to c (in stackpos 2) |
| 2 | move [1s]++, 45p | read *b into latch 45; post-increment pointer to b (in stackpos 1) |
| 3 | mult 32p, 2h, 31p | multiply content of latch 32 by 2; store result into latch 31 |
| 4 | mult 35p, 2h, 34p | multiply content of latch 35 by 2; store result into latch 34 |
| 5 | mult 45p, 45p, 44p | multiply content of latch 45 by itself; store result into latch 44 |
| 6 | neg 45p, 80p | negate content of latch 45; store result into latch 80 |
| 7 | mult 31p, 34p, 33p | multiply ... |
| 8 | sub 40p, 33p, 39p | subtract ... |
| 9 | sqrt 39p, 38p | calculate square root ... |
| 10 | add 48p, 38p, 37p | add ... |
| 11 | sub 48p, 38p, 47p | subtract ... |
| 12 | div 37p, 0p, 36p | divide ... |
| 13 | div 47p, 0p, 46p | divide ... |
| 14 | move 36p, [3s]++ | write latch 36 to *x1; post-increment pointer to x1 (in stackpos 3) |
| 15 | move 46p, [4s]++ | write latch 46 to *x2; post-increment pointer to x2 (in stackpos 4) |

METHOD OF INTERLEAVED PROCESSING ON A GENERAL-PURPOSE COMPUTING CORE

TECHNICAL FIELD

The invention relates to a method of data processing and data storage in a data-processing apparatus, computer program, data carrier, and data structure.

BACKGROUND ART

High performance computing (HPC) tasks are usually organized as sets of parallel execution threads. The method of simultaneously executing such sets of threads on sets of independently operating computing cores, called "multiprocessing" (MP), is a characteristic of state-of-the-art HPC and the main driving force behind the evolution of supercomputers with up to millions of cores and very high performance (FIG. 1, excerpt from the supercomputing top 500 list, June 2020, www.top500.org).

The extremely successful application of MP for HPC is possible because MP is linearly performance-scalable (LPS) at the global HPC system level as each additional processor linearly increases both data processing and data transfer bandwidths. On the contrary, MP is not LPS on a multicore processor as long as its cores share a common memory system—adding cores to such a multicore processor only increases processing bandwidth but leaves the shared memory bandwidth unchanged. Core-level methods of parallel thread execution—"multithreading" (MT)—are even more limited with respect to LPS computing as not only memory but also processing resources are shared between threads.

"Instruction level parallelism" (ILP) can also improve HPC performance. Many ILP methods are available, e.g. superscalar execution, which all have their merits but are not LPS. In this category, the invention proposes a LPS computing method that jointly parallelizes processing and memory access at the instruction level and solves the memory bandwidth problem. The proposed method features high ILP levels and a "very high throughput computing" (VHTC) mode.

Requirements for future HPC systems are described in JASON, MITRE Corporation, "Technical Challenges of Exascale Computing", JSR-12-310, April 2013, henceforth cited as "JASON". The 20 MW power envelope for exascale defined by JASON, chapter 2.1, restricts the energy expenditure per double precision floating point operation to a maximum of 20 pJ/Flop.

FIG. 1 lists the energy expenditures of today's 25 top ranked HPC systems. Number 1 of the list, Fugaku, misses the 20 pJ/Flop target by 3.4× at HPL (High Performance LINPACK benchmark, eval B), and by 106× at HPCG (High Performance Conjugate Gradient benchmark, eval C).

From this data, Fugaku's deviation from exascale requirements seems to very strongly depend on the type of workload executed. This finding is confirmed by all systems listed in FIG. 1 and can be understood as follows:

Comparing performance rooflines of cutting-edge processor architectures on equal power consumption terms, FIG. 2 shows a general purpose CPU (AMID Epyc 7H12), a special purpose GPU (Nvidia V100), and the general purpose Fujitsu A64FX, all contrasted against a general purpose CPU drafted according to the invention (topmost plot). All rooflines are scaled to a total power budget of 20 MW by accordingly adjusting the core count of a corresponding HPC cluster (cf. the legend of FIG. 2).

Rooflines are explained in JASON, chapter 4.4, and Samuel Williams (in "Performance Modeling and Analysis", *University of California at Berkeley*, February 2019, *CS267 Lecture*): Rooflines state the upper performance limit of a workload (logarithmic vertical axis) vs. its arithmetic intensity AI (logarithmic horizontal axis). Each roofline has a "ridge point" RP (circle); the AI coordinate of said RP is the "machine balance" MB of the system. To the right of the MB lies the domain of its "compute-bound", to the left that of its "memory-bound" workloads; any deviation of a workload's AI to the memory-bound side of the MB is punished by the system with a performance penalty.

Regarding workload AI requirements, JASON notes in chapter 4.4: "Scientific applications of interest for DOE or NNSA span a range in arithmetic intensity, but rarely have intensities above 1". This finding is confirmed by an evaluation of 1,162 scientific computing kernels which have a median AI of 1 Flop/B (H. Pabst et al., "LIBXSMM library targeting Intel Architecture (x86)", *Intel High Performance and Throughput Computing*, Switzerland, March 2017).

From such empirical workload AI data (FIG. 2, 3), the MB of a "capable" HPC system should be designed at 1 Flop/B or less. None of the HPC top 25 systems remotely complies to this figure of merit indicating a severe mismatch between empirical workload requirements and today's leading HPC technologies (FIG. 1, eval D, for comparison purposes (!) estimated from measured HPL and HPCG data with AI=0.24 Flop/B for HPCG, V. Marjanović et al., "Performance modeling of the HPCG benchmark", 2014 *Lecture Notes in Computer Science*, vol. 8966. Springer, Cham).

The effects of said mismatch—called "memory wall"—imply that typical HPC workloads on typical HPC systems spend far more than 80% of their runtime in the idle state waiting for memory access, wasting both system runtime and most of the electrical power spent for execution.

For the systems of FIG. 2, FIG. 3 demonstrates the memory wall effect on workloads like stencil operations (used for solving differential equations), computational fluid dynamics (CFD), numerical weather prediction (NWP), and CP2K which simulates solid state, liquid, and molecular systems.

One standard method of mitigating the memory wall effects comprises the use of cache hierarchies—already included in the AI data of FIG. 3–which work on a unit stride packet based scheme, fetching and storing so-called "cache lines". Certain workloads benefit from such a rigid memory access scheme, others do not. The adverse effects of non-unit stride and/or non-packet-based access on memory bandwidth—called "memory mountain"—are a downside of all cache-based processor architectures (CPUs, GPUs).

The following prior art methods are generalized by the invention:

The method of "modulo scheduling" is described by B. R. Rau et al. in "Code Generation Schema for Modulo Scheduled Loops", *Proceedings of the 25th annual international symposium on Microarchitecture*, Portland, Oregon, USA, Dec. 1-4, 1992, *IEEE Computer Society Press* Los Alamitos, CA, USA (henceforth cited as: "Rau") as a scheduling technique which yields highly optimized loop schedules. According to Rau, modulo scheduling can be supported by a processor's hardware, namely, among others, by "rotating register files" that provide a conflict-free data passing mechanism between "stages" of the modulo scheduled loop by means of cyclic "register renaming". Features distinguishing the latter mechanism from the invention's "pipelined memory" concept are:

1. Scope—limited to small elementary loops (Rau) versus arbitrarily large loops that comprise inner control structures and subroutine calls that may be nested to an arbitrary depth (invention);
2. Mapping—limited to one single core and control flow (Rau) versus extensible to multiple cores, threads, and control flows (invention);
3. Implementation—registers (Rau) versus memory (invention).

The method of "systolic data processing" is described by H. T. Kung in "Why Systolic Architectures", *Journal Computer*, Volume 15 Issue 1, January 1982, *IEEE Computer Society Press* Los Alamitos, CA, USA (henceforth cited as: "Kung") as applicable to high-throughput and highly specialized hardware. Essentially, systolic hardware is designed in such a way that all data processing units operate in lock-step—"systolically"—which yields maximum data throughput rates.

The method of "explicitly parallel instruction computing" (EPIC) is described by M. Schlansker, B. R. Rau in "EPIC: An Architecture for Instruction-Level Parallel Processors", *HP Laboratories Technical Report*, 1999 (henceforth cited as "Schlansker/Rau").

"Transport triggered architectures" (TTA) are described by H. Corporaal et al. in "Using Transport Triggered Architectures for Embedded Processor Design", DOI: 10.3233/ICA-1998-5103 (henceforth cited as "Corporaal") and generalized by the invention to a "transaction triggered architecture".

A method of operating a general purpose stack machine with efficient multithreading mechanisms used by the invention is described in the patent application "Method of allocating a virtual register stack in a stack machine" (Kinzinger Automation GmbH, US20190065198A1, henceforth cited as "PAT1").

A method of type safe, pointer safe, and cyber secure polymorphic data processing proposed to be used with the invention is described in the PCT application "Method of secure memory addressing" (Kinzinger Automation GmbH, EP3420446A1, henceforth cited as "PAT2").

Prime-numbered interleaved memory systems and a method of efficiently decomposing memory addresses into bank numbers and local addresses on such systems are described by J. Diamond et al., in "Arbitrary Modulus Indexing", *Proceedings of* 2014 *47th Annual IEEE/ACM International Symposium on Microarchitecture (MICRO)*, December 2014 (henceforth cited as "Diamond").

The method of "communicating sequential processes" (CSP) used by the invention to concurrently execute "interleaved processing" (IP) pipelines within a network called "IP superpipeline" is described by A. W. Roscoe, "The Theory and Practice of Concurrency", Prentice Hall, 2005 (henceforth cited as "Roscoe").

CSP-based software concepts used by the invention are described in the "occam reference manual", (*SGS Thomson Microelectronics Ltd.*, 1995), and were implemented e.g. in the T800 transputer chip series designed by INMOS, Bristol (both references henceforth cited as "Occam").

SUMMARY OF INVENTION

Advanced 3D chip stacking and chip interconnect technologies allow a significant increase in the number and bandwidth of processor-to-memory channels. This paves the way for a groundbreaking revolution of HPC technologies which is driven by an innovative "interleaved processing" (IP) method and—based thereon—a "very high throughput computing" (VHTC) method that is applicable for a broad range of general purpose workloads.

VHTC multiplicatively combines the two accelerating effects of
  instruction level parallelism (ILP) on a general purpose IP core with a freely scalable set of parallel processing units that supports LPS "instruction interleaving" on a per-instruction basis;
  software pipelining which hides instruction latencies.

Expected per-core VHTC performance rooflines for various IP cores are shown in FIG. 8, 9 compared to the optimal-case performance roofline of a leading-edge general purpose HPC core which processes well-aligned unit-stride vectors with its internal vector unit (dotted line)—said roofline is much lower when the core processes strided vectors ("memory mountain") or pipelined loops for which it has no integrated "accelerator" hardware. The latter two processing modes are covered by VHTC which delivers compute-bound peak performance over the whole HPC workload range.

In order to achieve such VHTC performance a series of inventive steps is proposed, each step building up upon the benefits of its predecessor by incrementally extending today's technology scopes, effectively creating a radical non-von-Neumann approach to computing itself:

Step 1 of the invention proposes a distributed processing element called "parallel processing channel" (PPC) which has a unidirectional data flow design linking data processing to data storage capabilities; the latter reach from fast on-chip SRAM scratchpad to large off-chip memory for seamless working set memory integration (FIG. 4-8). Said PPC approach eliminates the memory wall problem at the PPC level with per-core MB values below 0.3 Flop/B which meets exascale requirements (MB≤1 Flop/B, JASON) and solves the processor utilization problem of state-of-the-art HPC.

In a PPC, the usual role of general purpose registers as fast access data processing buffers is played by the M1 level of the memory hierarchy (42) which lies in close vicinity to both the local ALU (41) and control unit (71). M1 (53) serves as a scratchpad memory (SPM) that is optimized for maximum storage capacity at minimum access latency and is transparently used by the software employing a memory virtualization technique which replaces the energy and chip area intensive data lookup circuitry found in today's caches (step 9 of the invention).

Step 2 of the invention proposes a generalization of memory interleaving techniques to a method of interleaved processing IP using a PPC set (72) that is controlled by a central control unit (71) to which it is connected by an m-fold cyclic data transport, processing, and storage scheme (FIG. 7) which jointly parallelizes processing and memory access at the instruction
level and implements the above-mentioned "instruction interleaving".

Said scheme allows not only parallel access to the core's interleaved M1—which comprises all local M1 (51) buffers of the memory system (74)—but also to the entire interleaved off-chip DRAM working set memory M4 including the interleaved parallel on-chip M2 and M3 buffers and a set of m independent "direct memory access" (DMA) machines which parallelly execute all data transports via the m local ports (50-52) including, but not restricted to:

high-bandwidth background channel transfers which stream working set data to the core and back to DRAM memory M4;

automatic management of internal background stack transfers specified in PAT1 which in the below-described stack machine mode GPP constantly keep the frequently accessed topmost stack segment in the fast access interleaved M1 data processing buffer (this replaces the sequential compiler-managed "register spill/fill" of register machines by a hardware-automatic parallel mechanism which eliminates the state-of-the-art "register/cache bottleneck");

support for the temporal multithreading (TMT) scheduler when pre-loading the below-described "pipelined memory" buffers from their M2 . . . M4 backup allocations into M1 and offloading them after a thread is descheduled—such pre- and offloading being also applied to the M1 stack segments (cf. PAT1).

Said scheme supports "explicitly parallel instruction computing" (EPIC) with "very long instruction words" (VLIW). As the number of instruction read ports (76) scales with the PPC count m, high throughput EPIC with extremely wide VLIWs is possible. These VLIWs are decoded and partly executed by the CU (71)—e.g. for pointer dereferencing, data load/store, comparison, branching, and so forth—and, as far as ALU operations are involved, dispatched to the PPC set (72) via a dedicated parallel write port set (75) in the form of "very long transaction words" (VLTW). With such VLTWs, per each cycle, each of the m ALUs (73) can simultaneously be provided with its own specific machine instruction, operands, and result destination address. The implementation of EPIC with respect to ISA and compiler is discussed by Schlansker/Rau.

The IP core (70) has the following operational modes (FIG. 29):

GPP In its general purpose processing (GPP) mode, the IP machine works as a stack machine as specified by PAT1 and disclosed by step 9 of the invention. GPP is latency-bound von Neumann processing with sequential VLIWs and is used as a deterministic real-time data processing framework into which SIMD and VHTC steps can be embedded.

SIMD In SIMD mode, VLTWs consisting of identical instructions are internally generated by the CU via "data set machine instructions". In this specialized mode, the IP machine essentially functions like a GPU or vector processor (disclosed in step 3, cf. FIG. 28).

VHTC In this non-von-Neumann mode, systolically pipelined loops are processed with a throughput and energy efficiency approaching —if compared on equal terms with respect to implemented ALU numbers—almost the level of bare-metal ASIC implementations. Non-von-Neumann parallel control flow is embedded into the data stream in form of a so-called "control/data stream".

The scheme of FIG. 7 provides each instruction in a VLTW issued by the CU (71) to the PPC set (72) not only its dedicated and independent instruction path (43) and processing resource (41) but also its dedicated independent write access (47) to dedicated, independent memory (42). Hence, once the instructions of the VLTW are issued to the PPC set (72), execution and storing of the results are guaranteed to be simultaneously carried out in a fully deterministic way, without arbitration conflicts.

For memory reads (77, 78), decoupling is enforced by the compiler which—as far as possible—aggregates instructions into VLIWs which are known to be conflict-free with respect to their memory read ports (77, 78). Where this is not possible, a "flawed" VLIW is compiled which possibly might stall the control unit (71) for a certain number of cycles but will never stall the PPC set (72) as VLTWs are only issued by the CU when all operand data are fetched. As long as said CU stall lasts, the CU (71) issues VLIWs of other threads (fine-grained temporal multithreading, TMT). In such cases, there exists an upper limit of the execution time and thus, deterministic real-time execution can be maintained.

Conceptually, FIG. 7 links "instruction level parallelism" ILP—represented by the set of ALUs (73)—to "interleaved memory parallelism" represented by the set of distributed memory systems (74). Effectively, this extends the concept of the "instruction" as an elementary unit of computation to include data transfer to memory thus defining "transaction"—instruction plus data transfer—as elementary computational unit. "Transaction level parallelism" generalizes ILP; it is a unique feature of the invention.

PPC execution is triggered via (75) by transaction codes (opcode, opdata, address). Hence, FIG. 7 shows a "transaction triggered architecture" which can be understood as a generalisation of a "transfer triggered architecture" (TTA) in which execution is triggered by pure opdata moves (Corporaal).

Memory read and write operations of the CU (71) comply to a standard word interleaved memory addressing scheme (FIG. 10) but as a new and innovative element of the design, the specific ALU which has to execute a given instruction is implicitly selected by the interleaved memory address of the instruction's result. Being a consequence of the transaction concept, this circumstance simplifies hardware circuitry and compiler design and gives the IP method its name.

Step 3 of the invention proposes the implementation of SIMD processing (vector, matrix, tensor, general database) in the form of abstract machine operations and opcodes. Such operations are directly executable on the general purpose infrastructure of the IP core (70) and require neither extra "accelerator" hardware nor external data paths but only CU control logic to locally generate the internal VLTWs for SIMD execution.

SIMD opcodes process data set operands defined by descriptors (FIG. 15). Operands and results with regular—but strided—memory access patterns are always processed at full PPC capacity with m Flop/cycle throughput if the IP core has a prime numbered PPC count m (which is a question of core hardware design) and neither of the strides is an integer multiple of m (FIGS. 11-14) (which is a question of data set memory layout).

This unique performance feature solves the "memory mountain" problem of traditional cache-based architectures (CPUs, GPUs).

Notably, in the proposed SIMD processing concept no additional "gather" or "scatter" operations—i.e. no additional data transports—are required when operating on strided vectors or data sets. The IP core works directly on such data (cf. FIG. 12) which is another unique performance feature of the architecture that makes it well suited for general data set processing.

Furthermore, the SIMD method allows to define a set of standardized data set machine primitives for "Basic Linear Algebra Subprograms" (BLAS) and "Structured Query Language" (SQL). Such primitives may be hard-coded in the CU but can also be emulated (per exception handler) thus extending their use to a broad spectrum of core designs (FIG. 9) and "domain specific languages" (DSL) for data set intensive applications, inter alia in the fields of neural processing and artificial intelligence.

With the polymorphic data processing method disclosed in PAT2, scalar opcodes may also be used for standard data set operations (add, multiply, and so forth) on strided vectors, matrices and tensors which allows a clean way of directly implementing high-level Fortran-style polymorphic array processing statements at the elementary ISA machine instruction level.

Finally, CU control logic generates the VLTW for more complex operations like e.g. "division" or "square root" by unrolling their Newton-Raphson loop representations which guarantees the required 1 Flop/cycle throughput (cf. the solution implemented in the Intel Itanium architecture). The same approach can be taken e.g. for the calculation of polynomials, digital filters and so on which can be parameterized by suitable descriptors (cf. FIG. 15).

Step 4 of the invention extends the application scope of VHTC computing on IP cores to systolic pipelining of an elementary loop,
"elementary" meaning that the loop body consists of a basic block;
"pipelining" the method of software pipelining according to Rau;
"systolic" a high throughput execution mode in special-purpose hardware as described by Kung which according to the invention is applied to loop pipelining on a general-purpose computer.

A "data flow graph" (DFG)—as exemplified in FIG. 16—is a graphical visualization of the "intermediate representation" (IR) of a "static single assignment form" (SSA), e.g. compiled by a "low level virtual machine" (LLVM) compiler from a high-level language source. The DFG describes the code in an abstract non-sequential—non-von-Neumann—manner by reducing it to a directed graph of data dependences between operations.

Accordingly, step 4 proposes a method of deriving IP code for a systolic pipelined elementary loop from its high-level language source which uses the LLVM-compiled DFG of the loop's body as a starting point, namely:
Read the DFG as a low level virtual data flow machine design, as it were, of a "virtual ASIC", in which each operation is executed by an independent parallel "virtual operator" (VO).
Construct "data wavefronts" that enter the DFG in its input VOs at a rate of 1 wavefront/iteration. Each wavefront propagates along the DFG's data paths and ends where output VOs are reached. During steady-state, the DFG is then filled with a self-replicating pattern of propagating wavefronts in which each such wavefront represents one iteration of the original loop which is sequentially processed by the iterations of the pipelined loop body ("kernel").
Taking into account VO latencies (cf. FIG. 18), construct the systolic timing diagram of the DFG as exemplified in FIG. 17 in which the data wavefronts appear as vertical lines. Although said timing diagram is optimally "dense"—i.e. it guarantees minimum latency of each single data wavefront as each VO is immediately executed as soon as its input data are available—data transfers between VOs have non-zero latencies that for systolic operation must be FIFO-buffered (first in, first out) as proposed in step 5.
With such FIFOs, the processing task of the virtual ASIC can be described by a "virtual VLIW" which comprises all VO instructions including FIFO and memory read/writes, along with information about the DFG-defined buffered datapaths that connect said VOs.
If mapping said "virtual VLIW" of the DFG to one "machine VLIW" exceeds the available PPC resources, the virtual VLIW is split into a group of q machine VLIWs which constitute the kernel; the loop executes 1/q iteration per cycle; each iteration takes q cycles.

Step 5 of the invention translates the above-introduced FIFO concept—pipelined buffers—into IP by proposing a method of "memory pipelining" which is facilitated by a new memory addressing method which has a semblance to the known "rotating register file" method of the Intel Itanium architecture but applies to memory instead of registers (FIG. 19, 20). With memory pipelining, FIFOs can be implemented in large numbers and sizes from a very large resource (74) of memory, preferably on-chip SRAM. Thereby, it becomes feasible to "pipeline" entire HPC workloads, as elucidated by the following steps:

Step 6 of the invention proposes to embed thread execution control flow information into all data words processed and stored by the IP core (70) effectively creating a combined "control/data word" as drafted in FIG. 22. Accordingly, all elements of the IP core (70) are adapted to process and store such control/data words (which for brevity are continued to be also called "data" words). The method of step 6 is compatible and combinable with the method of type safe, pointer safe, and cyber secure polymorphic data processing proposed by PAT2 and a unique feature of the invention.

Using said method to create "idle" wavefronts whose data are marked by a "NULL" bit (FIG. 22), "prolog" and "epilog" codes (pipeline fill/drain) which according to Rau precede and follow the steady-state kernel loop code can be eliminated; this leads to dense pipelined loop representations that merely consist of the kernel (cf. the Intel Itanium solution).

Said pipelined loop kernel can be preloaded into the control unit (71) and executed without causing further instruction traffic which reduces energy consumption and increases computing performance thus narrowing the traditional performance gap between software-defined loop execution on general purpose CPUs and special purpose bare-metal ASIC processing (at least if all FIFO data are kept in M1 SPM, cf. step 9 of the invention).

Using idle wavefronts allows to run the advanced loop operation modes illustrated in FIG. 21 (b-d) in which the loop can begin a new data packet while clearing out an old data packet (b); process data packets that are shorter than the loop's stage count (c); or process arbitrary sequences of data packets of varying lengths (d). Kernel operation modes (b-d) require multiple parallel control flows which cannot be executed on von Neumann architectures. Accordingly, what in the von Neumann domain is called a "systolic pipelined loop" transforms—when operated with control/data—into a non-von-Neumann type of elementary data flow operator which is characteristic for VHTC and henceforth called an "IP pipeline".

Now although in the case of FIG. 21a N algorithmic loop iterations take N+S−1 iterations of the corresponding IP pipeline to compute all results—S denoting the number of pipelined loop stages (S=57 in the case of FIG. 17)—VHTC execution of the first algorithmic loop iteration requires the same number S of cycles as its latency-bound GPP mode equivalent if the pipeline's timing diagram is "dense" which means, as mentioned before, that it guarantees minimum latency of each single data wavefront.

Hence for N>1, with respect to data packet latency, VHTC outperforms GPP (or, for that matter, superscalar execution on a modern CPU) by far (in the DFG of FIG. 17 asymptotically reaching a factor 56×). Thus, VHTC is not only useful for high throughput "number crunching" but depending on pipeline utilization—packet size and repetition rate, cf. FIG. 21 (b-d)—and questions regarding energy/memory consumption, thread switching overhead etc. in certain cases at least partly for real-time data processing, hardware-in-the-loop, latency-critical, and interactive applications.

Step 7 of the invention elucidates how a conditional loop (for, while) with multiple parallel control flows can be executed by an IP pipeline (FIG. 24).

Step 8 discloses how the EPIC method of predication can be translated into the realm of non-von-Neumann control/data flow processing so that a conditional statement (if-else, switch) of arbitrary complexity and nesting depth can be processed by an IP pipeline (FIG. 25).

Step 9 of the invention explains how multiple IP pipelines are executed by parallel threads which may be located on the same or on remote IP cores and how such IP pipelines communicate control/data in a data driven way forming what is called an "IP superpipeline". Furthermore, it is explained how the memory virtualization of both GPP stack and pipelined memories (FIG. 19) can be used to replace the energy and chip area intensive data lookup circuitry found in today's caches.

Step 10 of the invention exemplifies how an elementary loop in which one operator is replaced by a subroutine call to a second elementary loop can be deconstructed into an IP superpipeline which consists of a net of three communicating IP pipelines (FIG. 26).

Step 11 of the invention explains how any algorithmic loop with inner control structures (if-else, switch, loops etc.) and any hierarchical depth of nested subroutine calls can be recursively deconstructed into an IP superpipeline that can be distributed over multiple threads and cores. In principle, said recursive deconstruction method implements the graph theoretical fact that any directed graph can be transformed into an acyclic directed graph (i.e. IP pipeline) by factoring out so-called "supervertices".

As most workloads execute repetitive work which is organized in loops, this last inventive step discloses how, using IP superpipelines, VHTC can be applied for an almost universal range of workloads.

As the above-mentioned recursive loop deconstruction method in each step creates new parallel threads, for each such thread a new decision can be made whether to process it in GPP/SIMD or in VHTC mode. This freedom of choice allows the compiler to fine-tune the code according to the workload's characteristics in terms of a trade-off between throughput, latency, energy consumption and memory requirements: Applications of the invention thus are expected to in practice consist of a well-balanced mixture of GPP, SIMD, and VHTC.

In sum, the proposed IP method
 solves the memory access problem
  ("memory wall", "memory mountain"),
 simplifies processor design
  (no registers, no register files, no register "renaming";
   no branch prediction with speculative execution, no out-of-order execution, no caches), and,
 by coupling instruction level to interleaved memory parallelism ("transaction") allows a systematic compiler approach to exploit previously hidden parallelization resources ("superpipelining")

Technical Problem

The problem to be solved is to seek an alternative to known concepts of parallel data processing which provides the same or similar effects or is more cost-effective.

Solution to Problem

To elucidate the solution, reference is made to the characterizing portion of the independent claims.

Advantageous Effect of Invention

The in invention gives rise to efficient data processing.

INDUSTRIAL APPLICABILITY

The invention may be applied, inter alia, throughout the semiconductor industry.

BRIEF DESCRIPTION OF DRAWINGS

The invention is presented by way of example, and not by way of limitation, in the figures of the accompanying drawings:

FIG. 1: PRIOR ART—today's top 25 supercomputers and evaluations
FIG. 9: The IP cores of FIG. 8: expected data
FIG. 10: Interleaved Processing is based on memory word interleaving
FIG. 20: Pipelined memory—the functioning of one buffer pipeline
FIG. 23: Preliminary draft of an ESC encoding scheme
FIG. 24: Scheduling of a pipelined conditional loop
FIG. 29: IP operational modes
FIG. 31: SMT on IP core (83)—prioritized per-PPC combination of VLTWs
FIG. 32: Scheduling—necessary ALU jitter
FIG. 33: Compiled DFG of FIG. 16—VLIW assembler code

DESCRIPTION OF EMBODIMENTS

Figure 5:
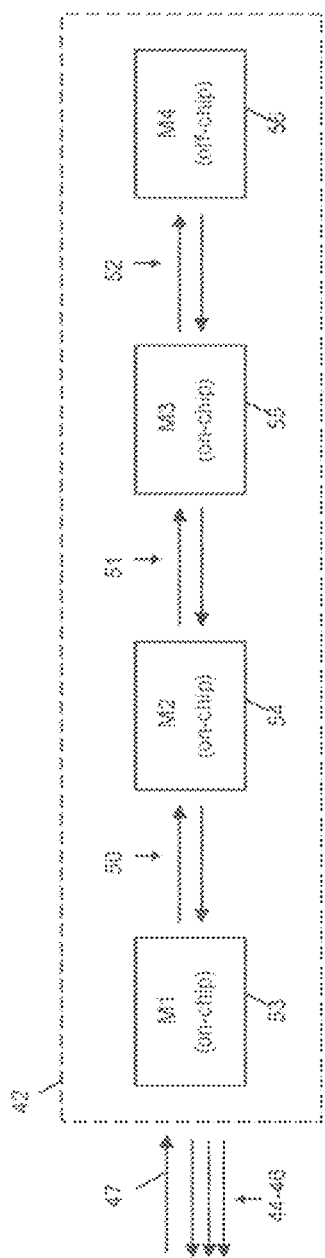
FIG. 5: Distributed hierarchical memory system of one PPC
Figure 6:
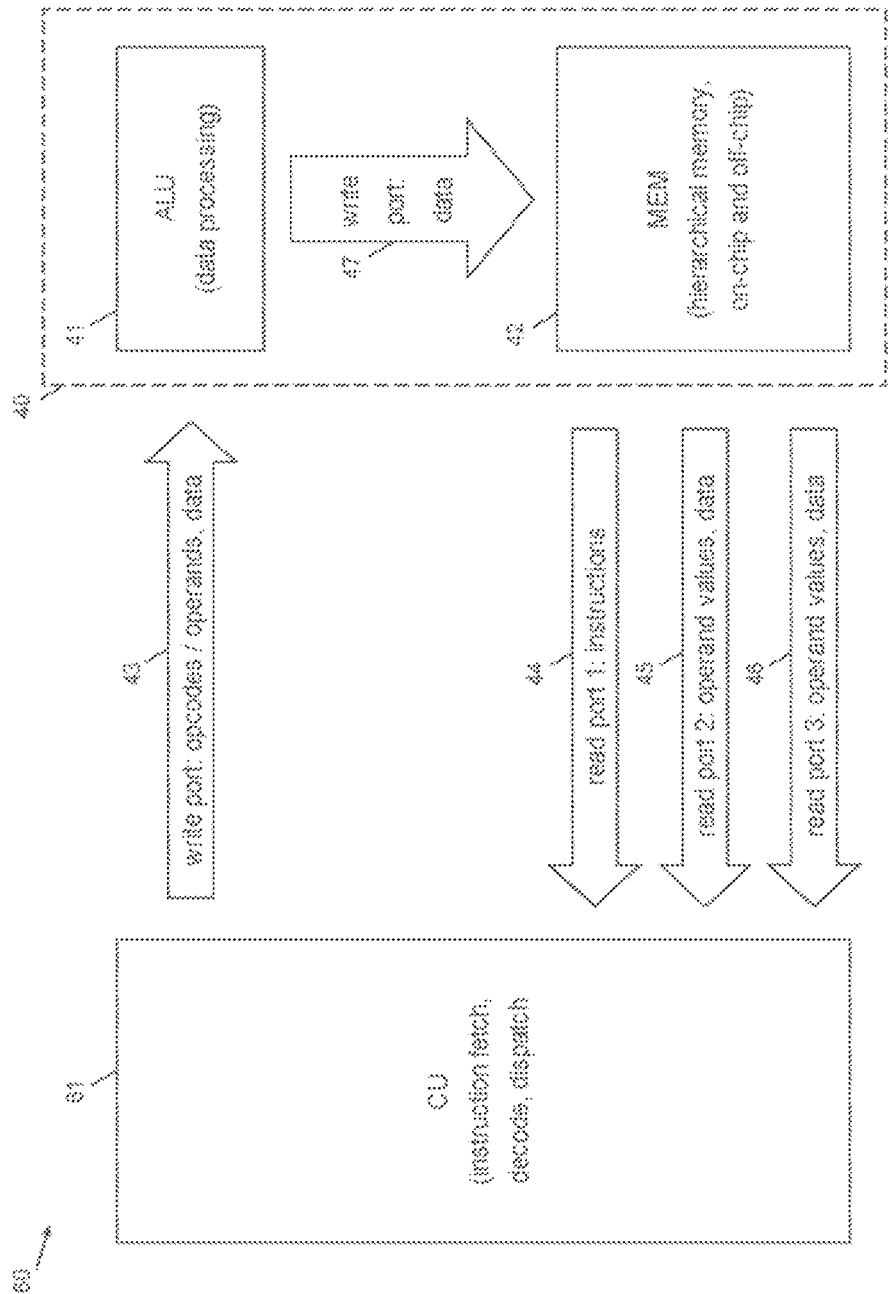
FIG. 6: Simple processing core built with one single PPC

With reference to the known method of memory interleaving—by which memory is organized as a set of parallel and independent memory banks on a DRAM module—each such interleaved DRAM bank (56) is extended as illustrated in FIG. 5 to form a distributed hierarchical memory system (42) that reaches from the DRAM bank (56) into a processor chip via a private chip-to-chip interconnect (52); the same "principle of privacy" further applying to the on-chip SRAM banks (53-55) of each distributed hierarchical memory system (42) and its internal interconnects (50, 51).

Each memory system (42) thus is a stand-alone unit which interacts with other units of the processor chip only through independent ports (44-47).

Figure 2:
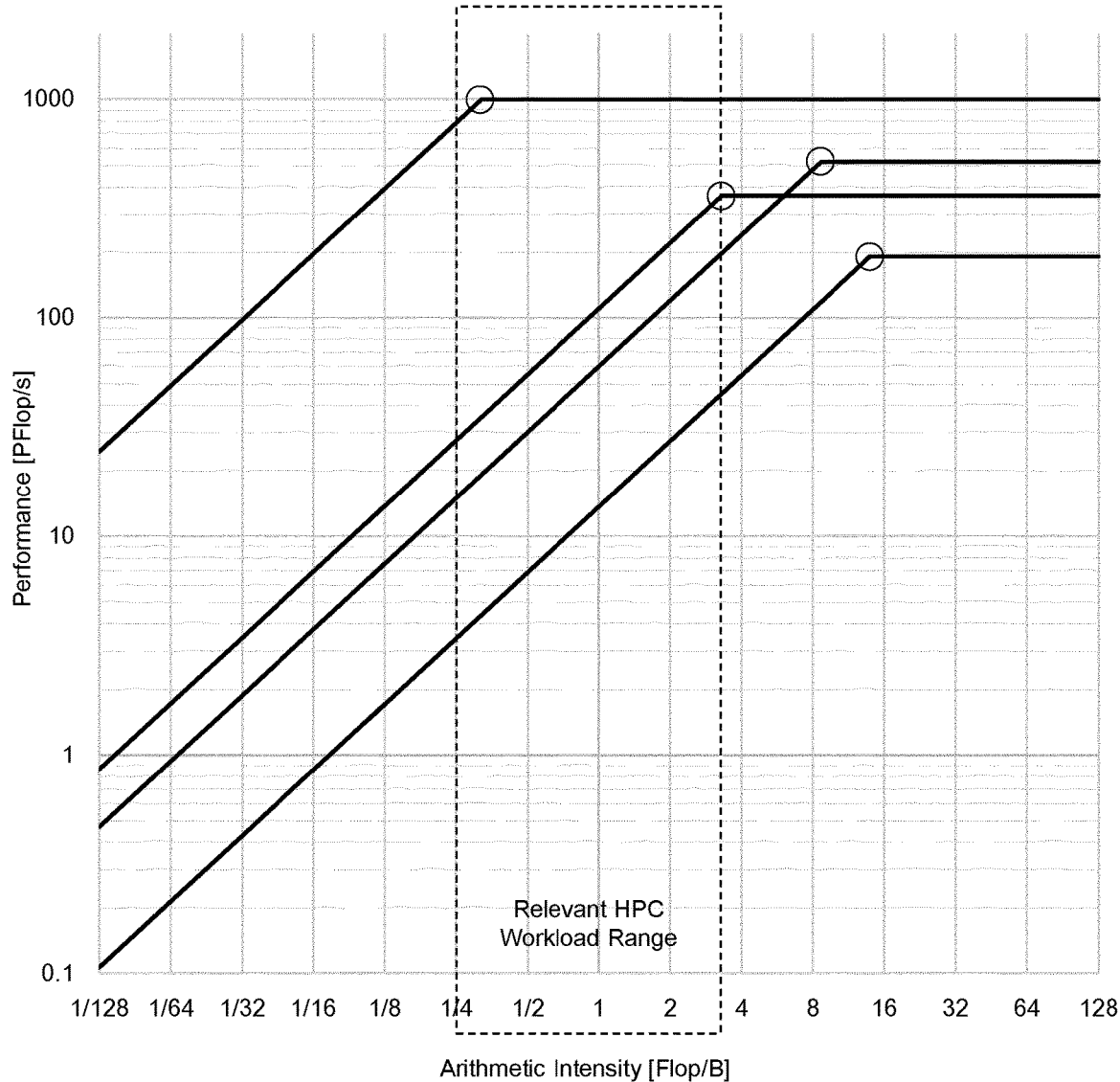
FIG. 2: PRIOR ART—rooflines of leading data processing architectures
Figures 3, 4:
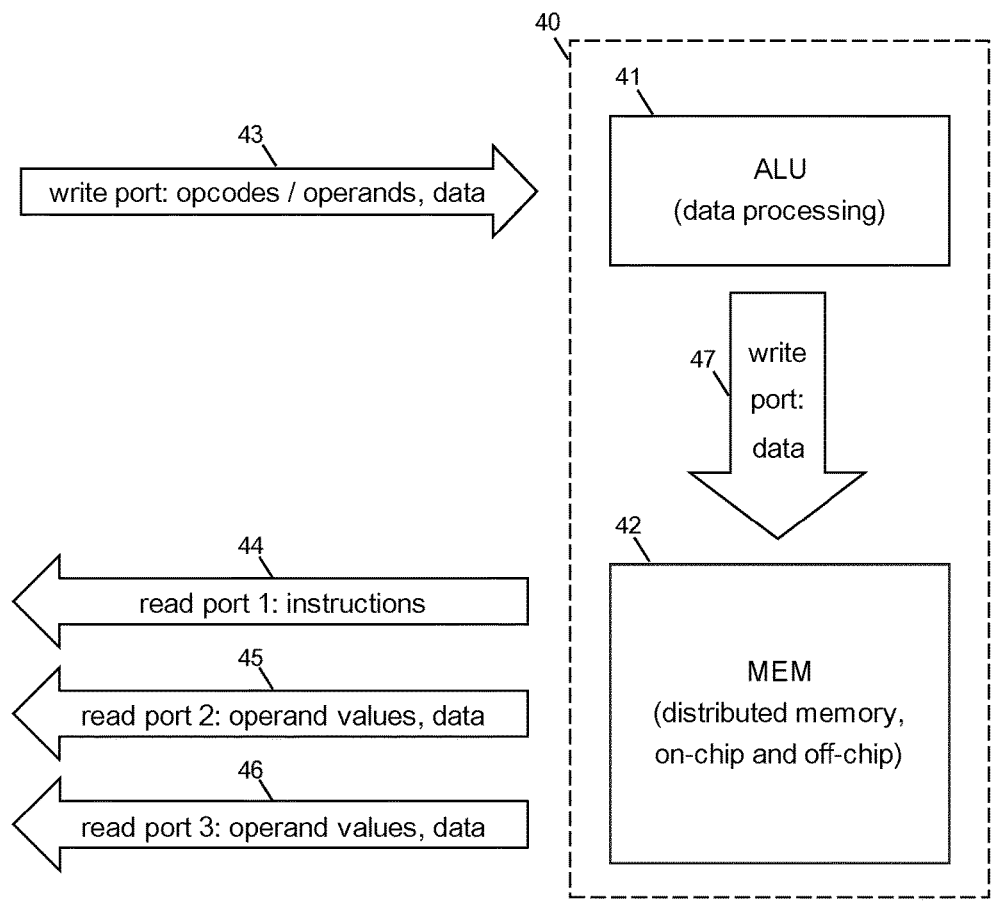
FIG. 3: PRIOR ART—read-outs from FIG. 2 for relevant HPC workloads
FIG. 4: Design of a parallel processing channel (PPC)

As drafted in FIG. 4, each memory system (42) is augmented by a private local data processing unit ALU (41) which consists of pipelined elementary processing elements (adders, multipliers etc.) and sustains a 1 Flop/cycle throughput for all types of data transformation it can execute according to the processor's instruction set architecture (ISA) (for compatibility with existing literature the term "Flop"—floating point operation—used in this application always includes any type of data transforming operation "op"). Furthermore, the latencies of each of said types of data transformation are required to have a firmly guaranteed lower bound and an upper limit above which the ALU is guaranteed to signal a stall request to the CU (71).

The assembly (40) is a stand-alone distributed processing element which interacts with its on-chip environment only via independent ports (43-46). Such an element (40) is called a "parallel processing channel" (PPC).

When creating a processor-memory system with 3D chip packaging and differential serial processor-to-memory interconnects (52), low-MB PPCs can be built. This is exemplified in FIG. 9, row (87), in which a 2 GHz clock, 1 Flop/cycle, and therefore a 2 GFlop/s throughput for the ALU (41) was assumed, and for the interconnect (52) a bidirectional differential bit link of 2×25 Gb/s bandwidth, which yields MB=(2 GFlop/s)/(6.25 GB/s), i.e. an (exemplary) machine balance of MB=0.32 Flop/B.

Figure 7:
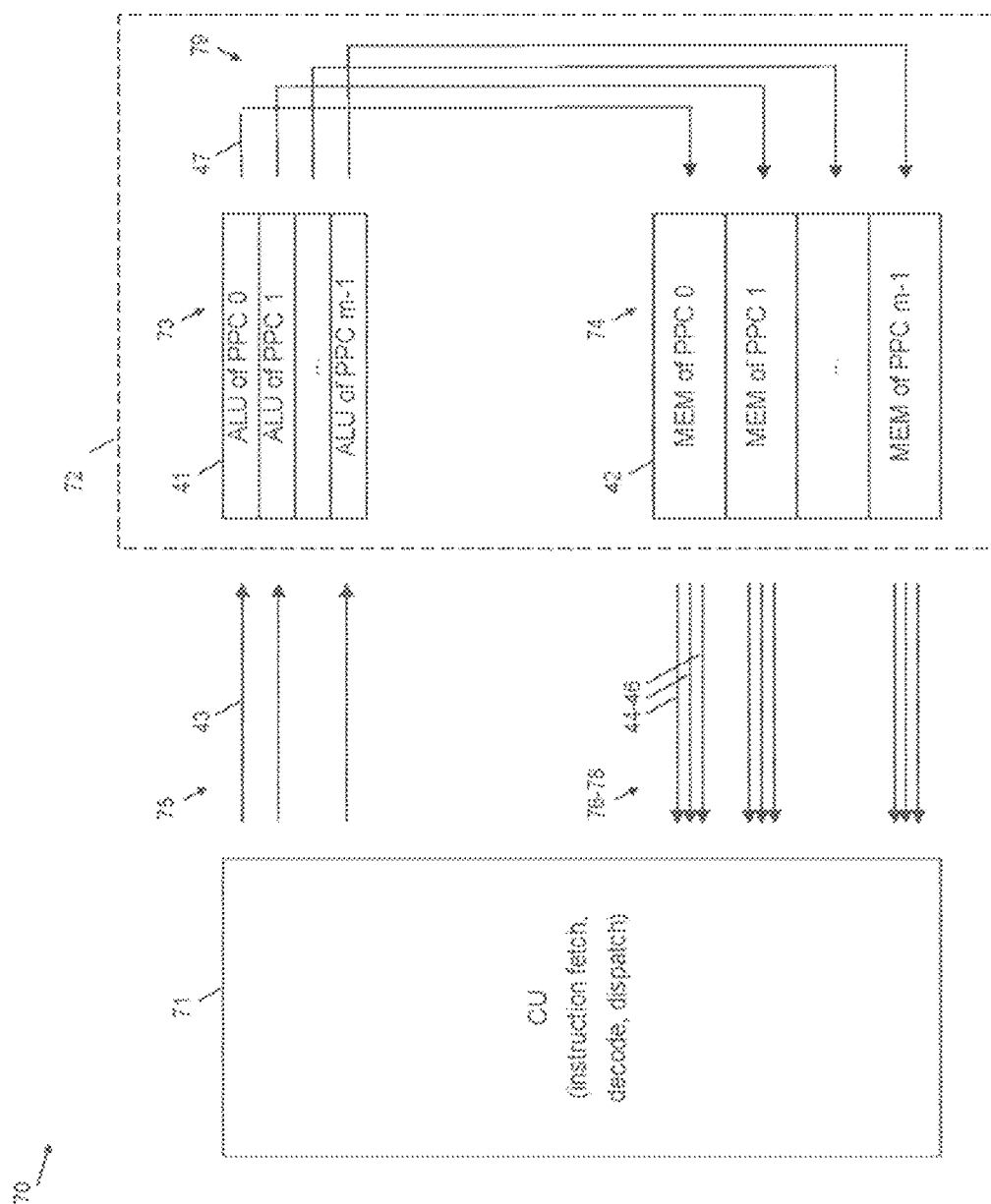
FIG. 7: Interleaved Processing (IP) core built from m PPCs

The method of interleaved processing (IP) is drafted in FIG. 7 from which it is clear that when building cores (70) with m PPCs (72), the accumulated processing and data transfer bandwidths both scale linearly with m. Thus, core-level IP is linearly performance scalable (LPS). With such cores (70), LPS multicore/DRAM packages with thousands of PPCs can be built, a rough order of magnitude for the upper limit being given by comparison with modern GPU designs (80×32 FP64 ALUs in a Nvidia Tesla V100).

Furthermore, high bandwidth parallel memory mapped I/O can be directly integrated in the memory system (74) which makes the design well-suited for HPC signal processing and future high-speed HPC interconnects.

Figure 8:
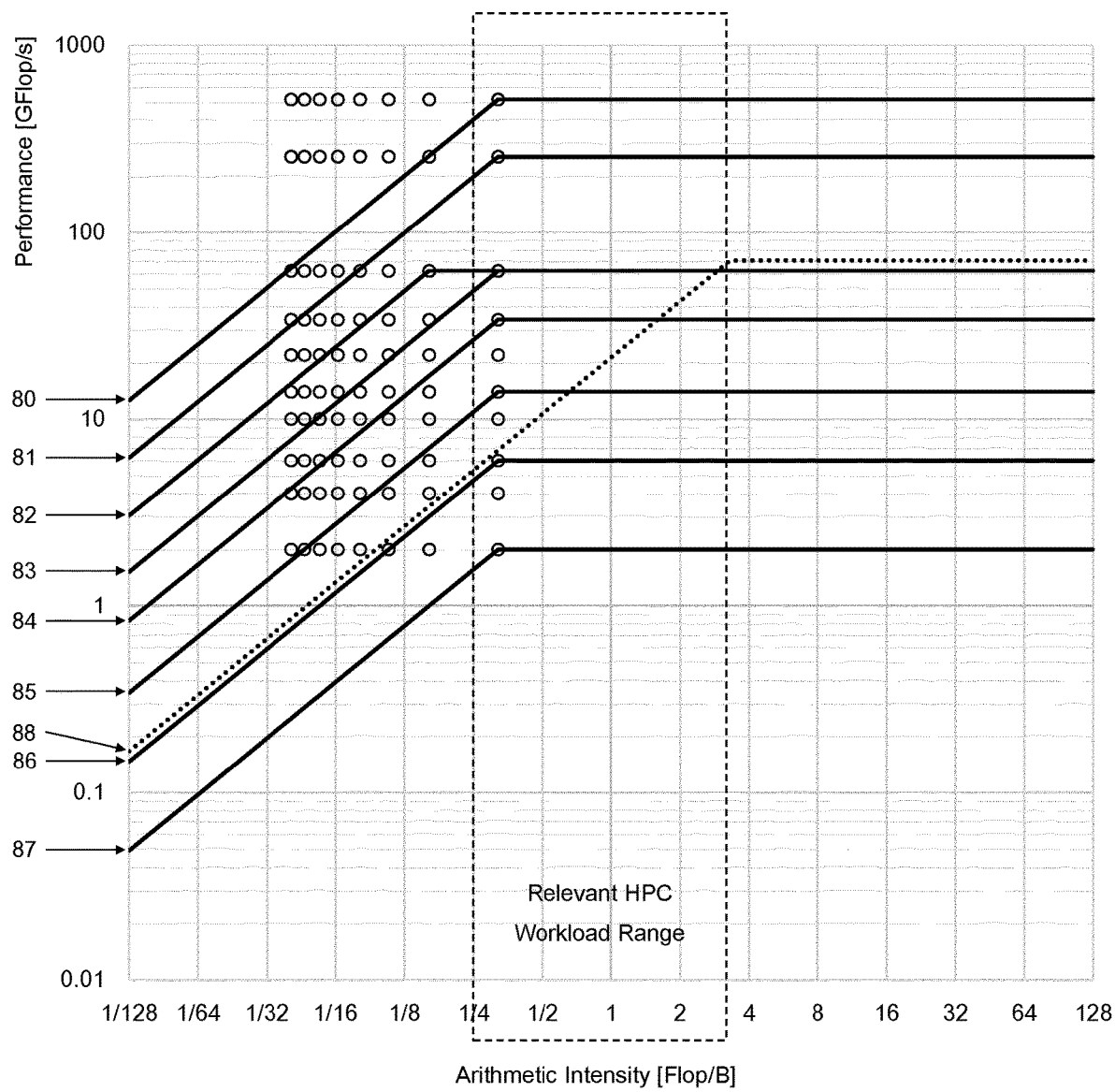
FIG. 8: Performance scalability—rooflines of various IP cores

The linear performance scalability of IP is illustrated in FIG. 8 for cores (80, 81, and 83-87)—PPC counts m are noted in FIG. 9—and visualized by the circumstance that altering the PPC count m of a core shifts its ridge point RP vertically—i.e. without altering the core's MB.

A second dimension of performance scaling is associated to the choice of the number n of bit lanes and transmission rate of the interconnect (52) which shifts the RP horizontally as indicated by the circle raster in FIG. 8. By such scaling, the MB can be adapted to workload AI requirements.

IP cores (70) use memory interleaving: each logical memory address adr accessed by software is decomposed by the CU (71) into a quotient a=adr/m and a remainder b=adr mod m. The latter b selects the PPC (40) from which to read data via its local ports (44-46) or to which to issue instructions via local port (43); the former quotient a selects the local memory address in the memory (42) of said selected PPC (40) where the data is physically located. This is illustrated by FIG. 10 which exemplifies the distribution of a logical address range of adr=0 . . . 154 over all local PPC memories for an IP core (83) with a PPC count of m=31.

As drafted in FIG. 7, all read and write accesses to memory (42) are unarbitrated. The latter are issued indirectly as data write instructions to the ALU (41) of the current PPC (40) which executes the pursuant write operation—again unarbitratedly—via local write port (47) to memory (42).

The latter principle also applies to all machine instructions that compute a result as the compiler then will have to specify which logical address to write said result to. As according to FIG. 7, the latter logical address can only be accessed by its local ALU (41), the same address decomposition of the CU (71) that governs memory interleaving when reading and writing data also selects which PPC an instruction is sent to for execution. This is the method of "interleaved processing" IP.

Figures 18, 19:
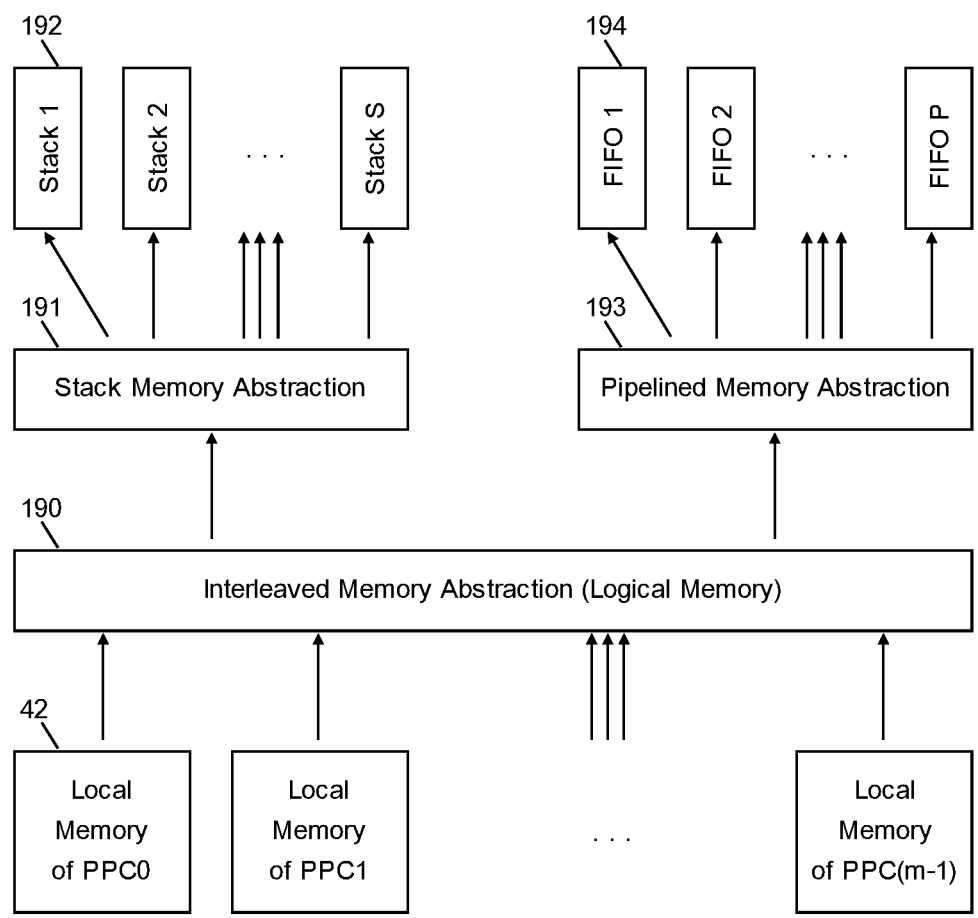

According to the invention, the basic operation mode of the core (70) is the general purpose processing (GPP) of a stack machine (SM) described by PAT1. FIG. 19 illustrates how on top of the above-explained interleaved memory abstraction layer (190), a second memory abstraction layer (191) implements the specific "virtual register stack" addressing method of PAT1 which means that the SM inherits the core's VLIW processing capabilities.

Now, the "virtual register stack" of the SM of PAT1 is addressable and handled by the CU (71); it therefore can be used to pass information from the software down to the hardware via a fast parallel interface (77, 78).

Figure 15:
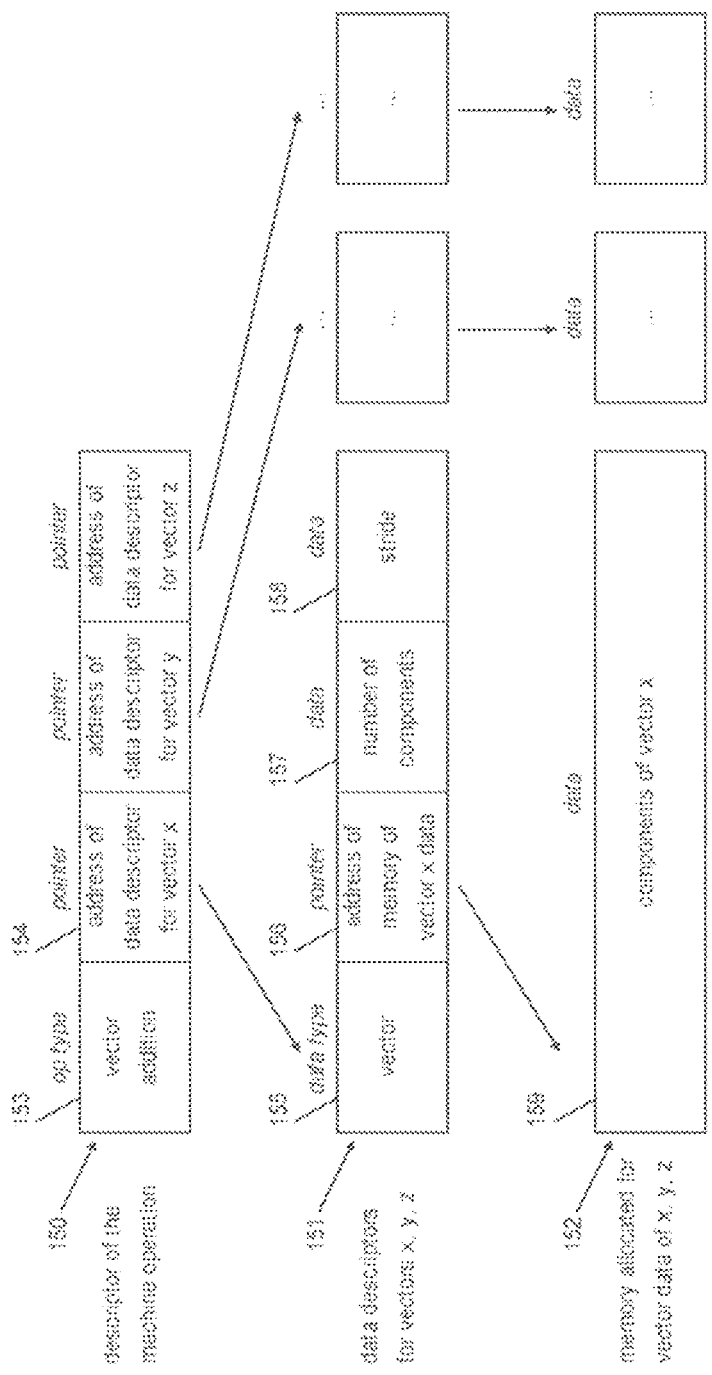
FIG. 15: Types of descriptors involved in a vector addition

Thus, the invention proposes the definition of SIMD machine instructions in the IP core's ISA that are parameterized by descriptors that are located on the stack. The general structure of such a descriptor is exemplified in FIG. 15 for a vector addition x=y+z: with a pointer to the descriptor (150) of said exemplary vector addition, the CU can read in its operation type selector (153)—"vector addition"—and pointers (154) to descriptors (151) of the vector data that have to be processed. In the given example, these describe vectors x, y, z each by a pointer (156) to memory (159), vector length (157), and stride (158). Via pointers (156), the CU can access the components of the vectors x, y, z for execution.

Figure 11:
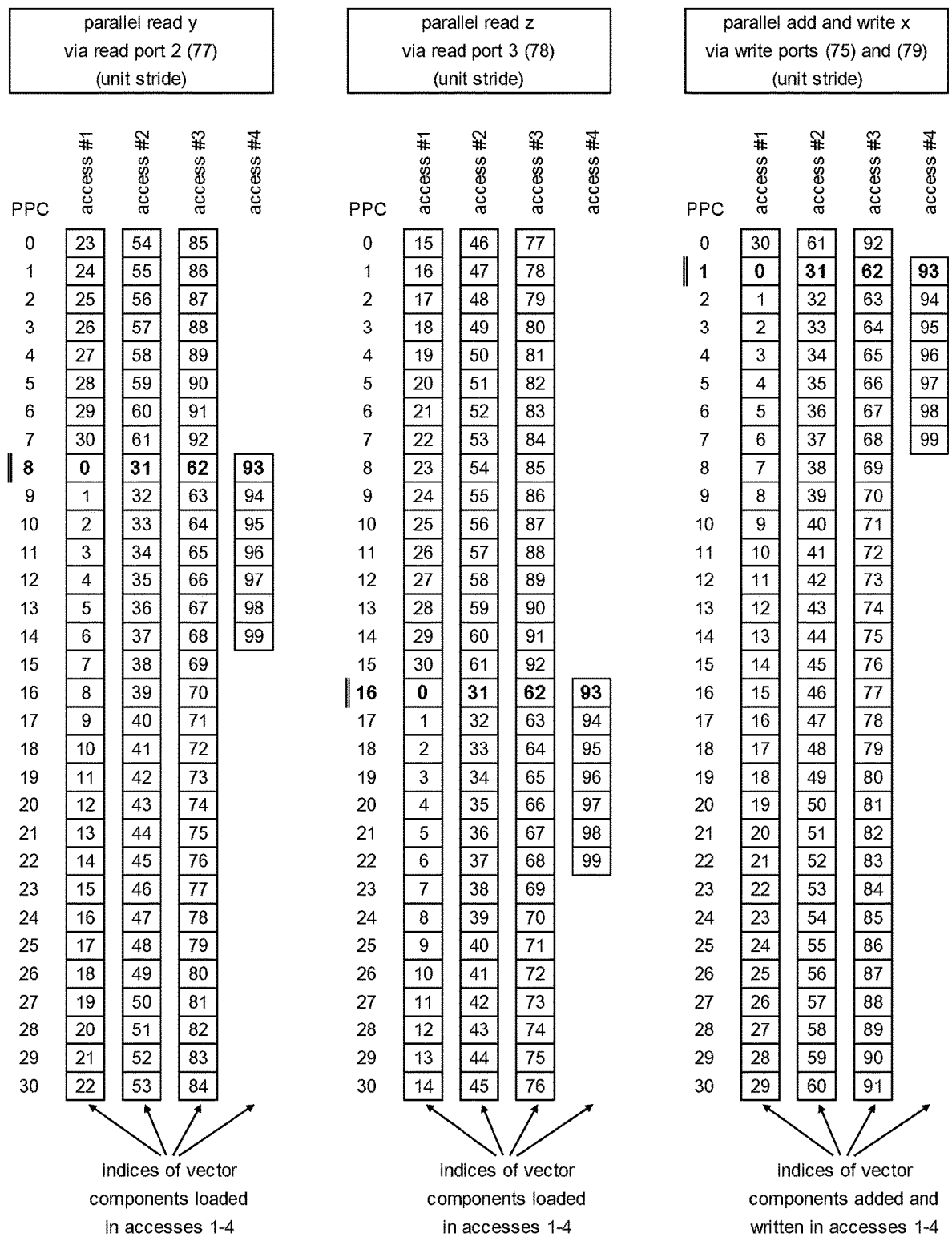
FIG. 11: Addition of unit stride vectors—Dense PPC port usage

FIG. 11 exemplifies a SIMD vector addition x=y+z on a core (83) which has 31 PPCs; vectors x, y, z have 100 components each and unit stride. Data accesses 1-3 of the addition fully utilize all 2×31 read ports (77, 78) and 2×31 write ports (75, 79). Thus, the core executes the first addition steps with full m=31 Flop/cycle throughput, regardless of "alignment".

Figure 12:
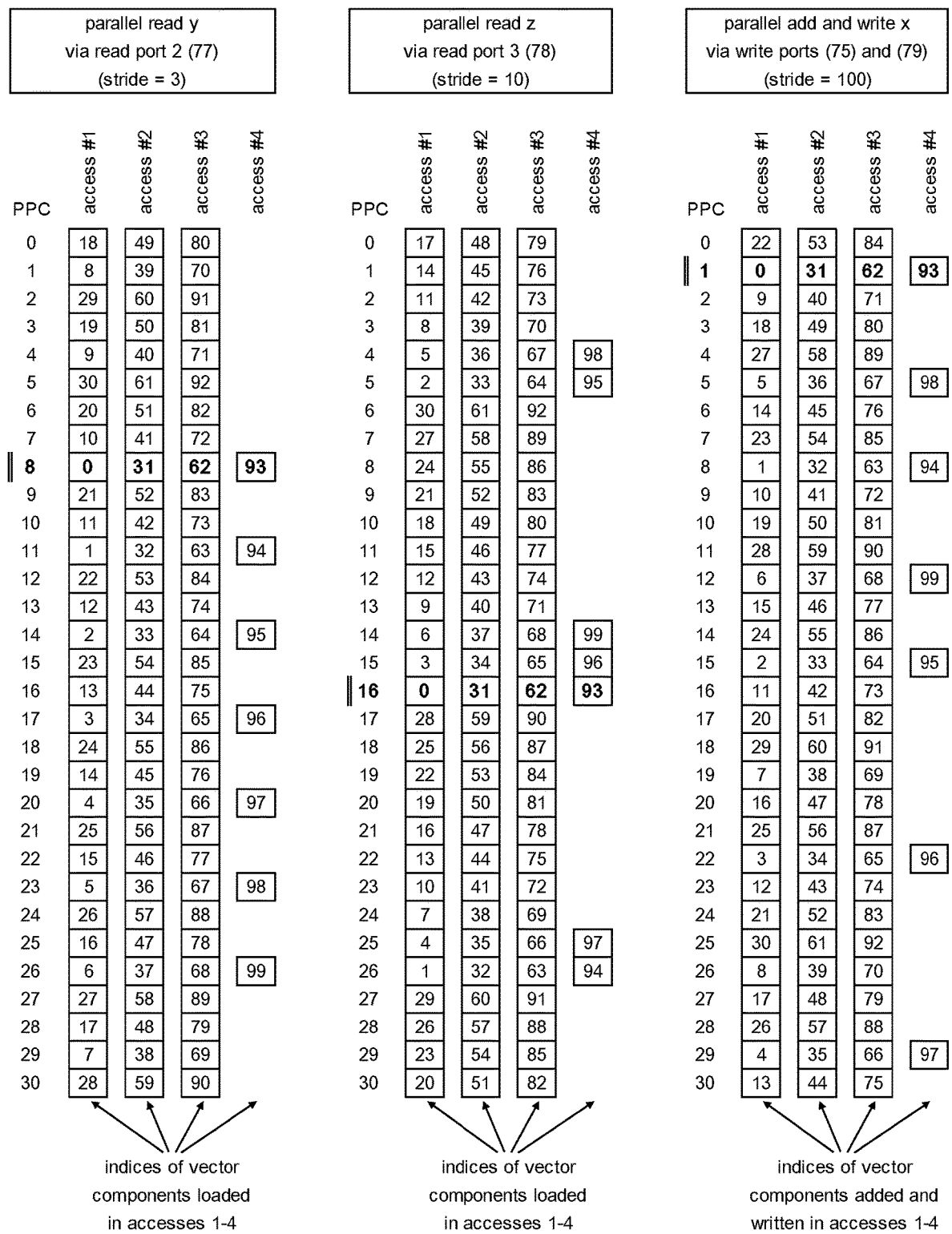
FIG. 12: Addition of strided vectors—Dense PPC port usage
Figure 13:
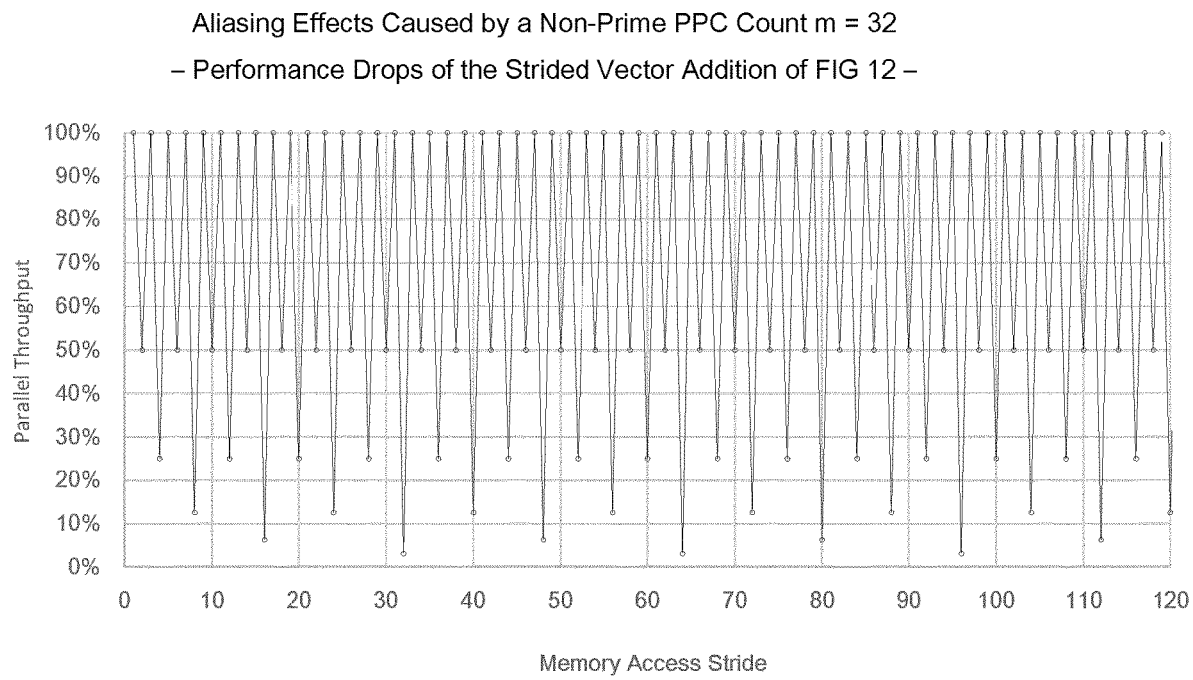
FIG. 13: Aliasing effects caused by a non-prime PPC count m

FIG. 12 illustrates that under one below-explained mathematical condition all of the foregoing features of a unit-stride vector addition are preserved in the case of a strided vector addition. The only thing that changes are the patterns of the m-fold interleaved memory accesses but all ports are still fully utilized; the frist three steps of the shown strided vector addition are still executed with full m=Flop/cycle throughput, regardless of "alignment":

Said mathematical condition refers to an aliasing phenomenon caused by a periodicity conflict between memory access stride s and interleaving stride m which does not occur if both strides s and m are relatively prime as demonstrated in FIG. 13 for m=32 PPCs and varying vector strides s.

Figure 14:
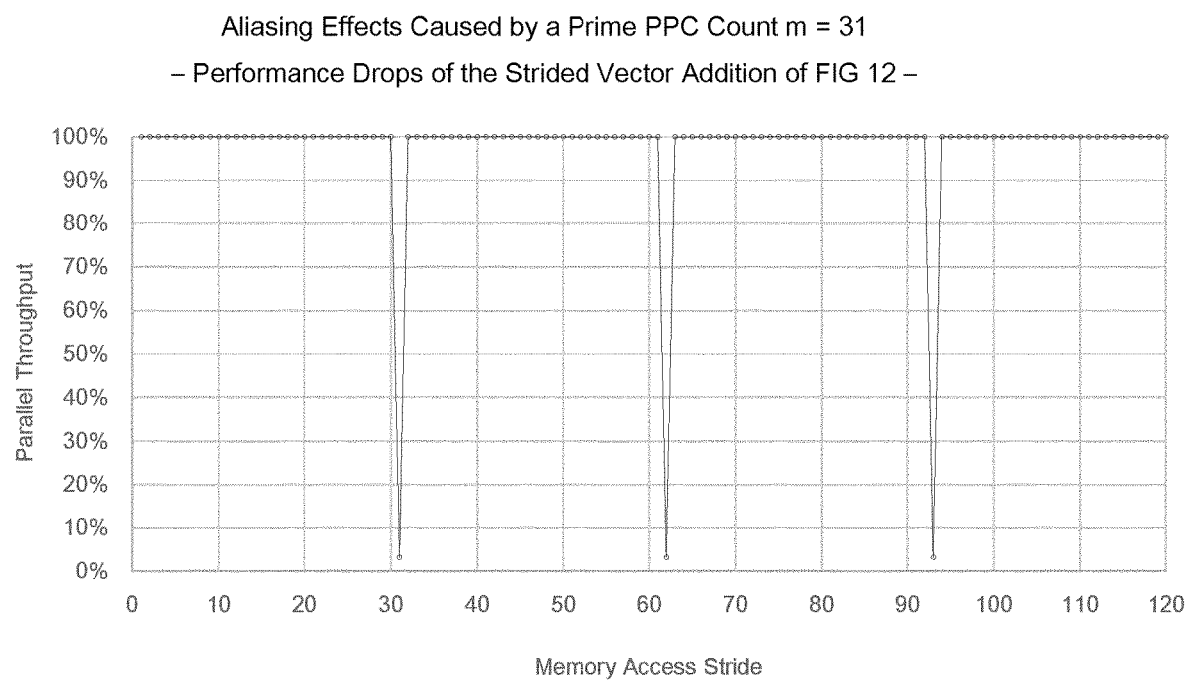
FIG. 14: Aliasing effects caused by a prime PPC count m

If on the other hand m is prime, e.g. m=31, the performance is constant except for cases in which one of the vector strides involved is an integer multiple of m (FIG. 14). In such a case, all components of the vector reside in one of the memories (74) only, and accordingly, performance drops to the level of a scalar m=1 core (87). In all other cases, it is mathematically guaranteed that any m subsequent accesses to the vector components of x, y, z are evenly distributed over the memory set (74) such that the data transfer bandwidths of all four port sets (77, 78, 75, 79) are fully exploited.

Therefore, to avoid aliasing as best as possible, m should be chosen as a prime number. An efficient address decoding mechanism (cf. FIG. 10) for prime m is described by Diamond and a selection of IP cores with such prime numbered PPC counts m is presented in FIGS. 8 and 9.

As an alternative to using explicit machine operation descriptors (150)—which is intended for the implementation of special procedures at the machine level—pointers to data descriptors (151) may also be directly passed to scalar machine instructions. In such a case, said instructions are executed as SIMD operations (e.g. vector dot product, vector scalar product, matrix vector multiplication, tensor contraction, and so forth).

One way to signal to the CU whether a value provided to an instruction represents a scalar value or a pointer to a data descriptor (151) is using typed data e.g. as disclosed in PAT2, Said method additionally allows polymorphic data processing as well as pointer safe, type safe, and cyber secure memory addressing.

With SIMD instructions, Fortran array, BLAS, and SQL primitives can be defined leading to a lean but yet powerful ISA which allows programming at a level of abstraction which hides (and internally manages) hardware details like the PPC count m of the targeted IP core. In other words, IP SIMD processing is "vector length agnostic" as vectors are treated as whole objects and need not to be explicitly decomposed at the SW level into chunks that fit into a (hardware-dependent)"vector unit"; this job is transparently performed in the background by the CU (71).

To further ensure software portability between various IP cores (FIG. 9) with respect to SIMD processing it is not necessary to implement the full range of SIMD instructions in CU hardware on each single IP core; a CU may alternatively emulate such instructions by exception handler routines. Such a method may be recursively invoked giving it a broad applicability.

Figure 16:
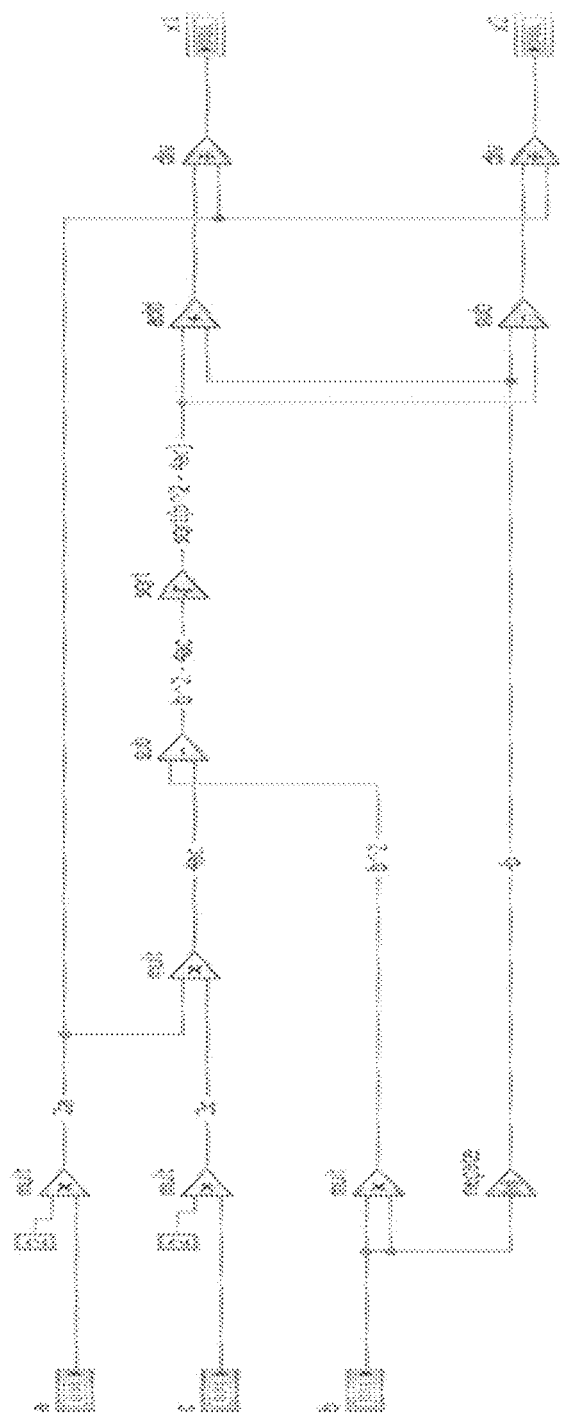
FIG. 16: Data Flow Graph (DFG) of an elementary loop body
Figure 17:
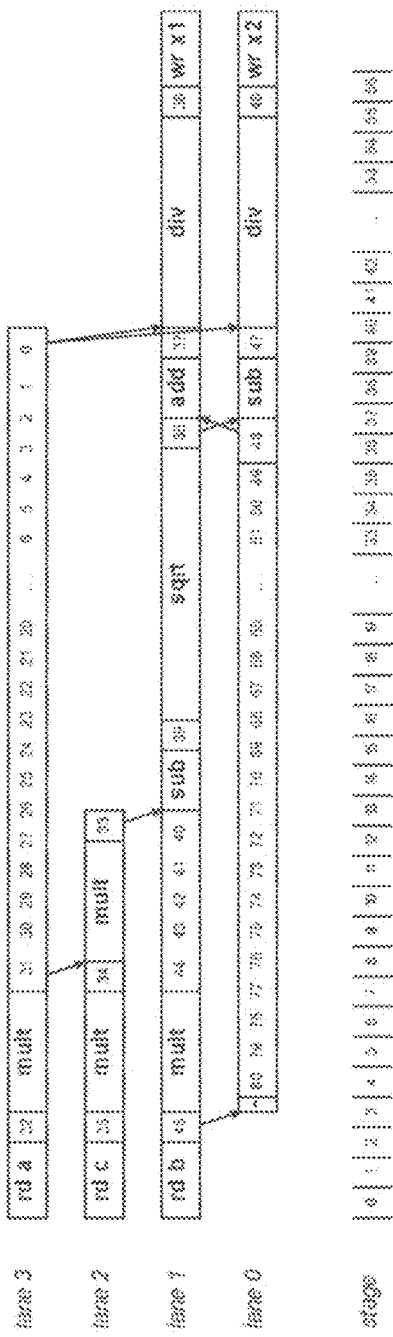
FIG. 17: Systolic timing diagram for the DFG of FIG. 16
FIG. 18: PRIOR ART—data of the numerical operations in FIG. 17
FIG. 19: Memory abstraction layers

FIG. 16 shows—in the form of a data flow graph (DFG)— an exemplary algorithm which for vectors a, b, c calculates roots x1, x2 of the quadratic equation $a*x^2+b*x+c=0$; and FIG. 17 shows a timing diagram for said DFG which illustrates how its software-defined algorithm can be executed when iterated in a systolic pipelined loop—at 11 Flop/cycle throughput on an IP core with sufficient PPC resources.

This means that in the steady state each iteration of the pipelined loop simultaneously issues three input reads (a, b, c), four multiplications, one negation, two subtractions, one square root calculation, one addition, two divisions, and two output writes (x1, x2). On a core (83), these operations are encoded in a VLIW which implements the entire DFG— including data paths—within one single parallel superinstruction (FIG. 33) (this is a simple example; as mentioned above, square roots and divisions are expanded into sequences of 1 Flop/cycle FMA—fused multiply-add— operations like e.g. in the Intel Itanium architecture which increases Flops and throughput—i.e. the ILP—of the pipelined loop implementation FIG. 33 of FIG. 16).

Before starting the loop, said VLIW is fetched by the CU via instruction ports (44) and decoded. During loop execution, the CU iterates said VLIW without further instruction load or decode. Data read/writes are pipelined.

As explained above, the parallel instructions of the DFG are interpreted as virtual operators (VO) and for an intuitive understanding of systolic loop pipelining, the timing diagram of FIG. 17 might be imagined as a scheme of parallel "assembly lanes" (lanes 0-3) comprising "production machines" (input, numerical, output operators) interconnected by "conveyor belts" ("buffer pipelines") and mechanisms to pass objects between the parallel assembly lanes (arrows). Arrows indicate synchronized data transfer.

Evidently, buffer pipelines synchronize all data transports between the (internally pipelined) VOs of the DFG on a systolic cycle-to-cycle basis. In an ASIC implementation of FIG. 17, said buffer pipelines would be built as FIFOs which make sure that inputs a, b, c of each read-in are correctly processed in-time without interfering with any inputs a', b', c' of other read-ins or any of the intermediate results derived from such a', b', c'.

Translating said FIFO synchronization concept to general purpose IP, buffer pipelines are, according to the invention, implemented as chained sets of "pipelined memory" addresses called "latches". In FIG. 17, said latches are shown enumerated in the buffer pipelines.

In pipelined memory, data moves from latch to latch each time a loop iteration starts; but instead of physically moving said data, this behavior is virtually created by a memory address mapping method as follows:

According to FIG. 19, pipelined memory is allocated from interleaved memory (190) in blocks (194) of $2^n$ logical words (n is a positive integer and on a 64 bit machine, one logical word comprises 8 B). If the pipelined memory block (194) is allocated at a logical offset off, any relative logical address rel pointing to a logical word in said memory block corresponds to an absolute logical address adr=rel+off.

While executing the loop, the CU (71) uses a hardware loop counter i which is set to 0 when entering and incremented when iterating the loop. Each latch of a pipelined memory block (194) is dynamically mapped to a relative logical memory address rel per rel=(latch+i) $\char`\^(2\char`\^n-1)$; in other words, the relative logical address rel of the latch comprises the lower n bits of the loop-dependent sum latch+i.

FIG. 20 illustrates the dynamic relation for latch 44—in FIG. 17 located in lane 1 after the multiplication—for loop iterations i starting at i=1000. According to a dynamic mapping with n=7, at i=1000 the multiplication result is written to rel=20 as noted under "mult writes" where it is shown that during the following loop iterations, subsequent writes to latch 44 are directed to subsequent logical addresses rel=21, 22, 23, 24, . . . .

In other words, latch 44 sequentially writes to memory without overwriting older data as required for the functioning of a buffer pipeline. It does so at least for $2^n=2^7=128$ iterations which is sufficient to not interfere with any of the other latches 0 . . . 80 required by the timing diagram of FIG. 17.

Next, following the result computed at i=1000 in "mult output pipeline", with each loop iteration, said result appears to move from latch to latch where it can be accessed at latches=44, 43, 42, 41, 40, . . . . This mimics the desired FIFO data transport behavior of the buffer pipeline.

In iteration 1004—i.e. four cycles after the write operation at i=1000—the value stored in rel=20 can be read in from latch 40 by the subtraction operator ("sub reads") for further processing. Looking back in time, in the first iteration at i=1000 data that had been calculated by the multiplication at i=996 and—at that time—stored under relative logical address rel=16 is read from the subtraction's input latch 40. This is how both multiplication and subtraction can work simultaneously without interfering via their data dependence: both operators are decoupled because they simultaneously process different loop stages (i.e. iterations of the original loop).

From an LLVM compiler's point of view, each edge of the DFG of FIG. 16 is a fully SSA-compatible data transport implemented as a buffer pipeline. The compiler has to ensure that buffer pipelines do not overlap and uses the freedom of choice when allocating buffer pipelines within one pipelined memory block to resolve resource conflicts regarding ALUs and read/write ports of the given PPC set.

Buffer pipelines can also implement "loop-carried dependences". In a pipelined loop, the effects of the latter are best understood in "wavefront notation" by which each travelling wavefront is numbered by an index k assigned by the loop iteration index i at which wavefront k enters the pipeline in stage 0. Wavefront and pipelined loop indices are interrelated by k=i−s (s=stage). Each wavefront k represents one iteration k of the software-defined "algorithmic loop". As "loop-carried dependence" means that algorithmic loop iteration k accesses data computed by some earlier iteration k−Δk, at some stage s, wavefront k accesses wavefront k−Δk. Such an access is implemented by reading from a latch that is positioned Δ k stages to the right of said wavefront k.

Also, buffer pipelines are used when expanding complex operations like division, square root, sine, cosine, polynomial, digital filter, and so forth.

Finally, buffer pipelines can compensate runtime variations in the latency of operations. As specified above, ALU operations are required to have a guaranteed minimum latency and an upper latency limit above which the operation—when unfinished—stalls the CU until it has delivered its result. When planning the buffer write operation of an operator A, the compiler has to plan its latch allocation for the minimum latency of A; when planning a later buffer read by some operator B which consumes the result of A the compiler instead has to assume the maximum latency of A. The latch-to-address translation is performed by the CU and accordingly communicated to A. Therefore, A will always write its result to the same logical memory address, regardless of A's latency; integrity of B's read access is guarded by the above rules.

The above-mentioned runtime variations in the latency of ALU operations—called "jitter"—are needed to resolve memory access conflicts caused by latency differences between the ALU operation types. Taking FIG. 18 as an example, a multiplication issued in one cycle n would write out its result in cycle n+5. If unattended, in the very same cycle n+5 an addition issued in cycle n+2 would also need write access to memory. This resource conflict can be resolved by delaying the write-out of the later operation (addition) to the next cycle or even later as exemplified in FIG. 32 which shows how the ALU schedules local bus accesses on a first-come-first-serve basis. For stall-free operation, each subunit of the ALU (adder, multiplier etc.) has to be buffered by a hardware output FIFO; each such FIFO must at least provide enough capacity to—where necessary—extend the latency of the subunit to the maximum latency among the subunits (in FIG. 18: sqrt latency of 21 cycles).

The same is true for non-ALU operations like e.g. memory read and write as exemplified in FIG. 33 in which the systolic timing diagram of FIG. 17 is compiled into assembler code. It was assumed here that pointers to the input and output variables a, b, c, x1, x2 of the loop are located on the addressable GPP stack (PAT1) in top-of-stack-relative positions 0 s . . . 4 s which in logical address space are fixed. As in the same address space latches "virtually move" with each iteration (cf. FIG. 20, "mult writes"), access conflicts on memory ports (77-79) and transaction ports (75) are inevitable; this applies not only to pointers a, b, c, x1, x2 but also to their dereferenced values.

Apart from the above-mentioned hardware buffering—in this case: in the CU instead of in the ALUs—and neglecting the costly option of increasing port numbers the following solutions of mitigating memory access conflicts are viable which have to be supported by ISA, compiler, and CU hardware:

eliminating redundant memory read accesses—e.g. in FIG. 33: multiple read accesses to 45 p, 48 p, 38 p, 0 p needed for opcodes #5, #6, #10, #11, #12, #13 where the CU can internally distribute read-in values to construct said opcodes;

eliminating memory read accesses by contracting opcodes, e.g. opcode #0 with #3 to mult [0s]++, 2 h, 31 p and so on;

using pre-loadable special purpose I/O registers for pointers, e.g. mult [0 r]++, 2 h, 31 p with 0 r denoting such an I/O register;

using instruction read ports (76) for data read—as explained above, during loop execution the CU iterates pre-loaded VLIWs without further instruction load/decode, so these ports are "free" (this method is also useful when evaluating polynomials etc.);

increasing port capacity by using more VLIWs per loop iteration;

allowing pipeline stalls—as indicated above and explained below the TMT scheduler is capable of cycle-to-cycle thread switches, therefore, some other thread can utilize the PPC set as long as such a stall lasts.

Notably in this context, the timing diagram FIG. 17 oversimplifies matters regarding M1 memory access and CU latencies as e.g. in lane 2, latch 34, data between both multiplications have to be transferred from an ALU (41) via local port (47) to M1 memory (51) and from there via one of the ports (45, 46) through the CU (71) and instruction port

(43) to another ALU (41). But as long as all operations involved are fully pipelined, this overall delay can be balanced off by accordingly

- planning with overall operator latencies which include memory read and write access latencies;
- partly overlapping operations as the second operation must be issued before the result of the first is available—timing has to be adjusted in such a way that the memory handshake fits;
- decoupling the memory handshake by allocating a second latch for it—thereby, under no circumstances data will be overwritten before having been consumed.

In effect, memory pipelining offers a trade-off between memory and throughput. In principle, the pipelined memory could have an arbitrarily large access latency; this releases all restrictions regarding the size of the interleaved M1 memory block—which is mainly intended for use as pipelined memory reservoir—except for data transport energy restrictions.

But while this is true for throughput-oriented workloads it may be not for real-time applications in which case a second trade-off must be stricken regarding M1 latency versus throughput.

To summarize: using latches instead of logical addresses, loop-invariant machine code can be compiled (cf. FIG. 33) that virtually executes all data transports needed to implement the systolic data flow depicted in FIG. 17 without having to physically move the data in dedicated hardware buffers. Functionally, this method resembles the "register renaming" scheme of "rotating register files" (Rau; Itanium) but here, it is applied to potentially many and large allocations of interleaved memory—i.e. standard SRAM—instead of a small number of dedicated registers (Itanium: 96) and hence can serve as a foundational basis for the below-described VHTC method.

One a general note, the above-explained method of memory pipelining is not restricted to handling word-sized (on a 64 bit machine: 8 B) data items only but can also be applied to wider data types as e.g. quad floating point or 64 bit complex numbers. Then, a second pipelined memory block (194) must be allocated which "rotates" twice as fast as the standard block—i.e. transforms latches to relative logical addresses with a doubled step width: rel=(latch+2*i) ^(2^n−1). Then, in assembler code, latch types need to be distinguished by suffixes, e.g. '21p' denoting a single-step latch and '13p2' a double-step latch.

Figure 21A:
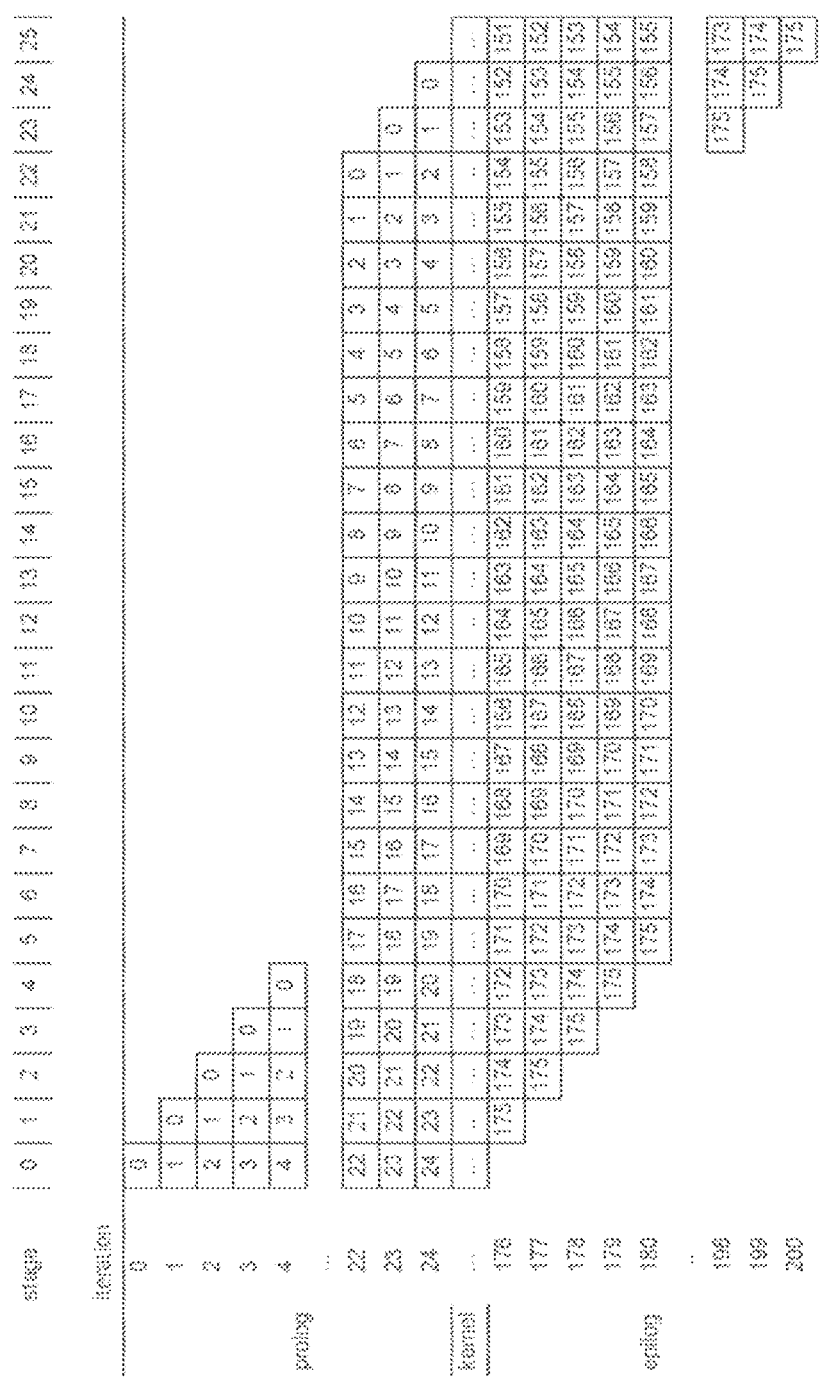
Figure 21B:
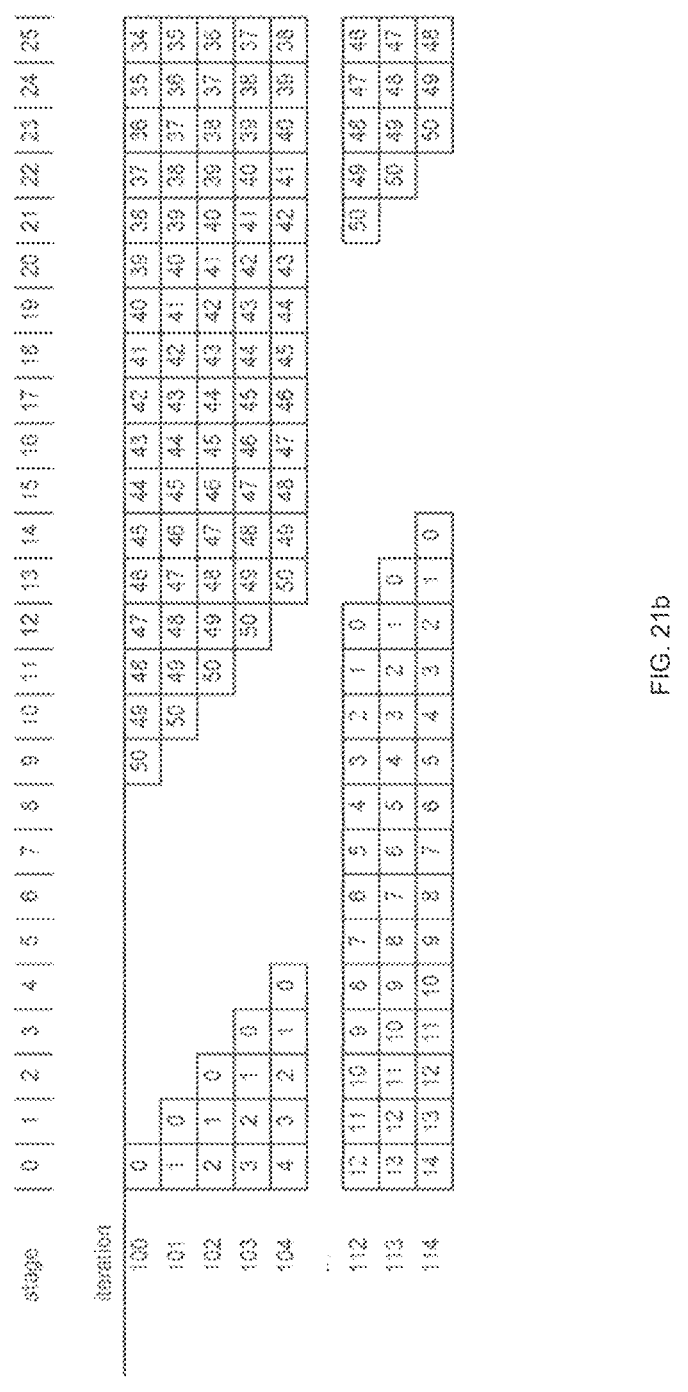
Figure 21C:
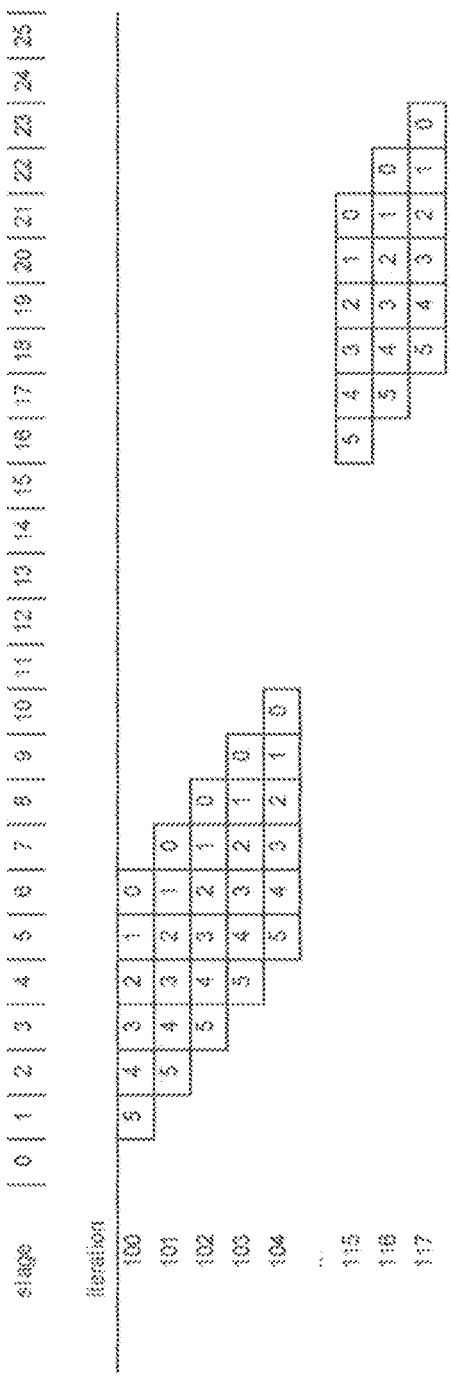
FIG. 21: Advanced operation modes of a pipelined loop
Figure 21D:
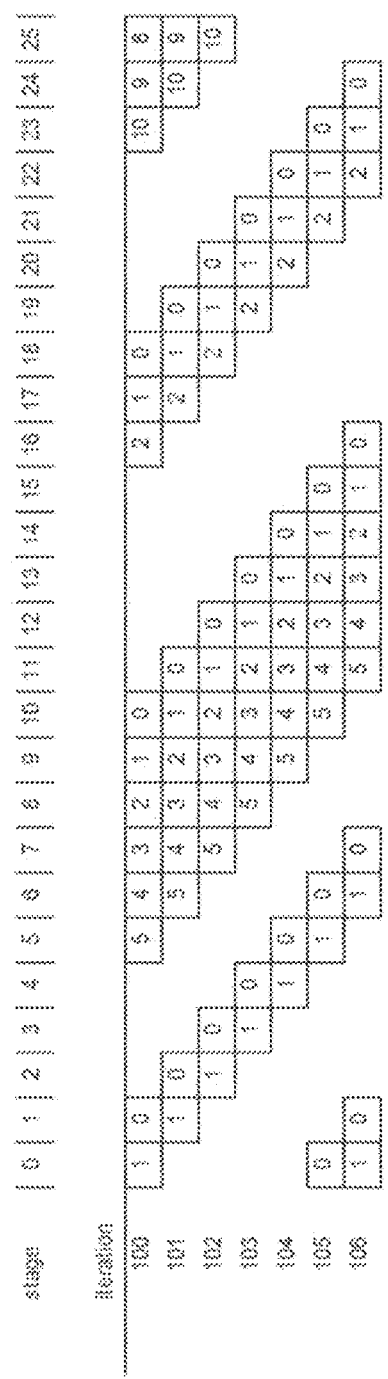

FIG. 21 shows that in general, pipelined loops need dynamic loop control. Table (a) shows a case in which the number of algorithmic iterations N is greater than the number of pipelined loop stages S. Under this condition, "prolog" (loop filling), "kernel" (steady state), and "epilog" (loop draining) phases can clearly be distinguished and a static compiler method (Rau) would assemble S prolog VLIW, one kernel VLIW plus control structure, and S epilog VLIW; well-known downsides of such static compilation are:

- The more stages S the loop has the bigger is its prolog/epilog overhead in relation to the kernel with respect to code size;
- Epilog latency is "dead time" as during epilog the loop cannot be restarted as shown in FIG. 21 (b) in which an "old" data packet is drained (epilog, right side) while a "new" data packet already fills the pipeline (prolog, left side);
- Scenario (c)—packet is shorter than the pipeline—and the multi-sized multi-packet scenario (d) cannot be implemented as both require parallel execution of multiple control flows.

Figure 22:
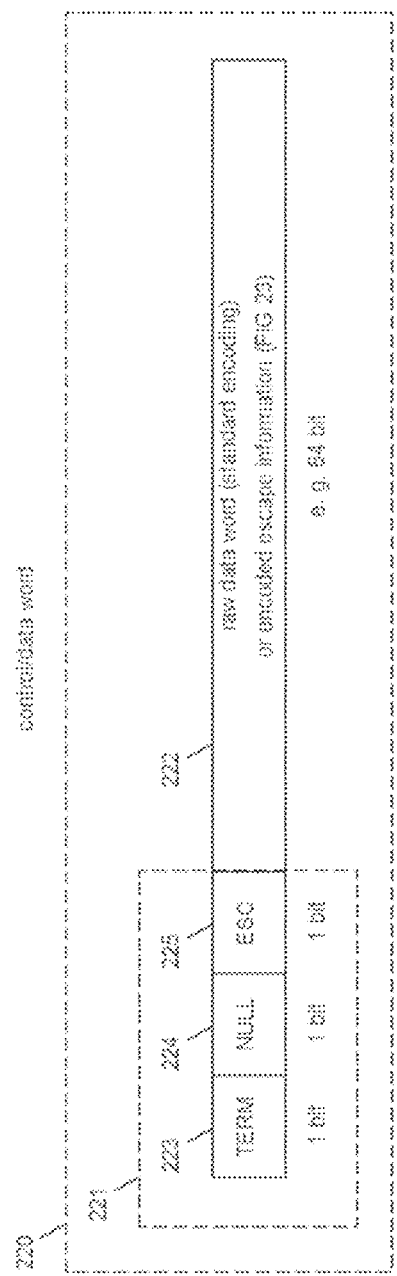
FIG. 22: Binary layout of a "control/data" word

FIG. 22 discloses how all of the above-discussed scenarios (a-d) can be handled by embedded control tags (221) which augment each data word (222) thereby creating a control/data word (220) which is processed as a whole, atomic item of information. Accordingly, each component of the IP core (70) has to support such control/data words (220) (which hereinafter sometimes are also simply referred to as "data").

The control tag (221) consists of three control bits, namely:

- TERM (223), used to stream parallel control flow information for algorithmic loop termination in conditional pipelined loops;
- NULL (224) which is not only used to stream parallel control flow information within predicated conditional statements but also for the scenarios of FIG. 21;
- ESC (225) which is used to embed various types of information into the data stream. A draft of the encoding of such information is shown in FIG. 23. Generally, numerical operators ignore ESC data and pass it on. ESC data is prioritized over standard (ESC=0) data if a numerical operator receives conflicting types at its inputs. Conflicting ESC data at operator inputs constitute an error.

With control/data, the scenarios of dynamic loop control of FIG. 21 are managed by introducing a "non-blocking" operation mode of the read (RD) operator in which it writes "valid data" (NULL=0) to the pipeline if a read was successful and "idle data" (NULL=1) if unsuccessful (which may be the case if the read operation stalls). Subsequent operators then either process the data in their predefined way (case: valid) or transmit idle data to the next operator (case: idle). Accordingly, the write (WR) operator acts on valid data only but skips idle data.

As said non-blocking mode avoids pipeline stalls and drains the pipeline as fast as possible when reading from data sources with littering latency, it can be used e.g. for real-time signal processing. In non-blocking mode, the pipeline is always "live", clearing out wavefronts as fast as possible, but has the disadvantage of also processing idle wavefronts which costs data transport energy along paths (75, 77-79) and overall performance (as the pipeline never deschedules and hence blocks all other threads).

In order to minimize energy costs and processing overhead, the pipeline automatically switches to the below-explained "blocking" mode when it is fully drained. In blocking mode, when stalling, a thread is descheduled by the temporal multithreading (TMT) scheduler and only rescheduled when new data arrives and the pipeline resumes its former non-blocking mode.

Additional hardware support to reduce data transport energy of idle data may take into account that in the idle case only the NULL bit needs to be stored and communicated via the internal busses.

In pure data processing workloads, instead of latency, optimal resource utilization is of interest. For such workloads the "blocking" operation mode is suitable in which the pipeline is descheduled when no input is available; the pipeline processes valid wavefronts only. Hereafter, blocking mode is assumed as the default IP pipeline operation mode.

A pipeline can be drained by an "end of transmission" (EOT) wavefront, i.e. a wavefront which comprises only EOT data (FIG. 23). After detecting (and passing on) the EOT wavefront through its set of RD operators, the pipeline switches from blocking to the above-described non-blocking mode in which it is drained (i.e. filled with idle wavefronts) until either a "start of transmission" (SOT) wavefront is received—in which case the IP pipeline returns to blocking mode as shown in FIG. 21 (b)—or the EOT wavefront has reached the set of WR operators which passes the EOT wavefront on. All of the valid wavefronts have then been written out; the pipelined loop accordingly terminates; execution control is passed on to its surrounding algorithm (i.e. to the GPP stack machine which executes the pipelined loop which upon EOT terminates so that the next following sequential stack machine instruction can be executed).

Synchronization of all RD and WR operators (which may be necessary when channel or physical I/O is involved) is enabled by the fact that VLIW execution can be stalled by each machine instruction—here: RD or WR—it comprises; said synchronization also works in the above-mentioned case in which one pipelined loop iteration consists of a sequence of VLIW.

Notably, all I/O operators like RD and WR are executed by the CU (71) which as a central unit coordinates the above-mentioned synchronization. The CU also holds pipeline state information, e.g. "blocking vs. non-blocking mode" (discussed above), "SOT may interrupt draining vs. full drain always" etc.

Accordingly, packet processing can be implemented with "start/end of package" (SOP/EOP) wavefronts including the option to either drain the pipeline after each packet or to keep it filled in blocking mode both modes having perks and drawbacks with respect to latency-bound real-time vs. throughput-bound standard data processing, as discussed above.

TERM is used in pipelined conditional loops as follows: A comparison operator determines whether the condition to exit the algorithmic loop is met and accordingly sets the TERM bit on data paths which lead to "conditional write" (CWR) and/or "conditional read" (CRD) operators.

Over CWR operators, the conditional algorithmic loop can deliver results. CWRs write out TERM=1 data only. In the result the TERM bit is cleared.

A CRD operator is a "two-way selector switch" which feeds a wavefront back into the pipeline for further iteration if TERM=0 or replaces it by a read-in wavefront to start the next algorithmic loop iteration (TERM=1).

FIG. 24 demonstrates how, using CRD and CWR operators, a pipelined conditional loop can gaplessly process wavefronts but will tend to reorder their sequence. This problem is solved by adding a "wavefront lane" (WL) to the DFG (cf. FIG. 17) on which upon read-in each wavefront is tagged by a serial WAVE number (FIG. 23). Said WAVE number is evaluated by the CWR operator when restoring the original wavefront sequence in its output buffer. Output buffer overflow protection requests—to temporarily block CRD input and instead insert idle wavefronts—are communicated over WL via NULL bit. The above-discussed TERM bit is also signaled via WL, and optionally, intermediate loop results can be written out using additional WLs. Simply put, WLs are used as the physical carrier of the pipelined loop's parallel control flow.

Parallel execution of many control flows as exemplified in FIG. 24 cannot be implemented on von Neumann architectures. The pipelined loop thus constitutes the above-announced new generic type of an elementary data processing structure called "IP pipeline".

In anticipation of the below-explained concept of "super-pipelining" it is noted that embedding an IP pipeline's internal control flow into a dedicated WL control/data stream allows to "split" any IP pipeline into a sequence of concatenated IP pipelines which can be executed by parallel threads that then may—if deemed appropriate—be distributed over a net of distinct cores or even processors. This option of "control flow distribution" and "pipelining pipelines" is a unique feature of the invention and expected to be useful when pipelining large complex workloads (workload balancing as discussed below).

In an IP pipeline, state-of-the-art predication methods can be applied to transform algorithmic conditional if-else statements into elementary blocks of "predicated instructions" which are executed if a certain condition holds and otherwise skipped. Such predicated instructions are executed/skipped without branching and thus can be used within the IP pipeline concept.

Figure 25:
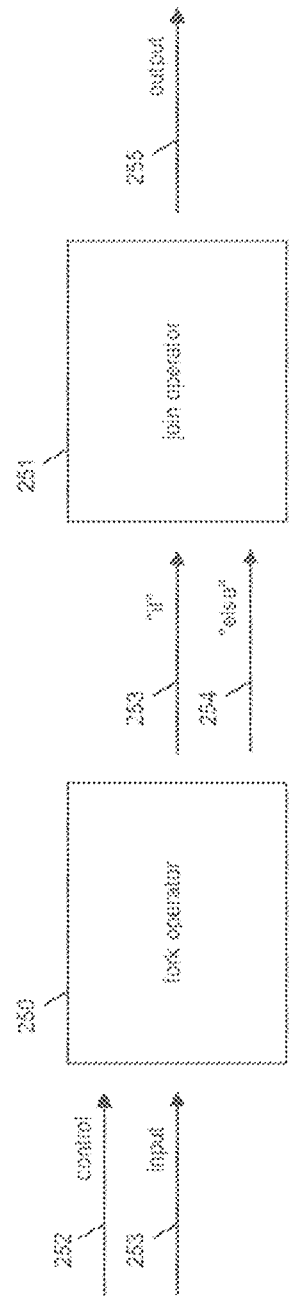
FIG. 25: Conditional fork operator and a join operator

Now within the context of the invention, control/data carried predication i.e. conditional operator execution—is available per NULL bit (FIG. 22). Accordingly, algorithmic branch instructions "if" and "else" are translated into "fork" and "join" operators which constitute control/data flow elements of the DFG and are executed by the CU (FIG. 25):

The fork operator (250) conditionally overwrites data in a buffer pipeline (253)—which in FIG. 25 appears as both input and output of the fork—and feeds a second buffer pipeline (254) with data. To do so, it reads a data word W from (253). If W is idle it writes idle words to both (253) and (254). If on the other hand W is valid, then—depending on the content of the control word (252)—fork conditionally either leaves (253) unaltered but writes an idle word to (254) or, alternatively, writes an idle word to (253) and copies the valid word W to (254). (253, 254) can be viewed as "if" and "else" branch pipelines of the fork operator.

The join operator (251) unites "if" and "else" branch pipelines (253, 254) to one result pipeline (255) by discarding all idle data and promoting valid data only—whichever branch provides it.

The decision which of the "branches" (253, 254) is selected to process the data is made by the fork operator (250) according to "control data" (252) depending on fork's comparison type ("equal to zero", "less than zero", and so on) as specified by the algorithm of the IP pipeline. Alternatively, a fork can also decide based on ESC control data (252); this additional option allows to use control flow (CALL, LINK, RET, TRAP), protocol (SOT, EOT, SOP, EOT), or administrative information like system status messages etc. for the conditional handling of all kinds of data flow states (FIG. 23).

According to the generating algorithmic if-else statement, the pair of "if" and "else" branches (253, 254) may be substituted by a pair of "conditional" DFGs (CDFG) which are not connected to each other but exchange control/data with the surrounding global DFG via a multichannel version of the fork operator (250) which has only one control input (252) but n inputs/"if branches" (253) and n "else branches" (254), a set of m joins (251) delivering m outputs (255)—m not necessarily being equal to n—and an optional set of k additional unconditional inputs that are available to both CDFGs.

Finally note that in the context of the above-discussed structure "speculative execution" can be implemented by making the fork operator unconditional (i.e. removing it) and instead either using a "conditional join" or the above join plus intermediate operators which at some point conditionally "nullify" the "if" and "else" data streams (conditional NULL operator).

Now as disclosed below, each of said CDFGs can be compiled into an independent new IP pipeline which will be executed by a parallel thread. The channel communication between sender and each of the two receiver IP pipelines is guarded by "multichannel fork" operators that behave like a multichannel version of the write operator WR by sending only valid data and skipping idle data. In such a parallel setup, the join operator has to be replaced by a "multichannel join" operator which accepts only valid input data from both parallel IP pipelines and ignores idle data.

Because of latency differences of the CDFG pipelines, communication, and multithreading/multiprocessing jitter, such a parallel setup will tend to reorder the original wavefront sequence and thus, "reserializing" by the "multichannel join" will be necessary. Overflow protection is automatically provided by the CSP ("communicating sequential processes", Roscoe) data flow execution model under which, according to the invention, parallel threads are run. Multichannel fork and join operators are implemented by IP SIMD machine instructions that accept channel lists as arguments (see above and cf. Occam).

Compared to predicated execution, guarded IP pipelines save energy. It nevertheless may sometimes be desirable to mix predicated with guarded execution e.g. in complex switch or other nested conditional statements.

An alternative to a guarded IP pipeline is the conditional sequential call to a subroutine. A use case for such a sequential call might be a handler routine which is invoked by the fork operator when receiving an ESC word on (252). Such a sequential handler call temporarily suspends parallel IP pipelined operation by invoking the GPP stack machine mode but offers flexibility for sporadic system responses which cost too much energy and performance when implemented in predicated code or parallel pipelines.

In principle, an IP stack machine could sequentially run any number of IP pipelines but according to the invention only one IP pipeline per IP stack machine is used. This simplifies the memory allocation scheme of FIG. 19, as each block of pipelined memory (194) is linked to one block of stack memory (192). The logical memory address offset of said block (194) and its size thus are intrinsic properties of the stack machine which are stored in its special purpose register (SPR) set. Therefore, to access a latch of said pipelined memory block a machine instruction only needs to specify its (relative) latch address—which e.g. in FIG. 33 comprises only 7 bit.

Secondly, according to PAT1 stack memory is accessed via TOS-relative (TOS=top of stack) addresses, which are typically "small". Thus, an ISA can be defined in which stack and pipelined memory accesses can be freely intermixed without giving rise to exceedingly wide instruction sizes; address types can be distinguished by postfixed letters 's' and 'p' in the machine code (FIG. 33) and by type bits in the respective address fields.

Thirdly, using the "safe pointer" method disclosed in PAT2, access to allocations in raw interleaved memory blocks (190) can be indirected via "safe pointer" objects which are located on the stack (and hence accessed via "small" stack addresses). The latter method can be used to mix read and write accesses to memory allocations in (190) with access to pipelined memory in VLIWs as needed for the execution of FIG. 17.

According to PAT1, thread switches require switching special purpose register (SPR) sets which hold the thread context consisting of instruction pointer, thread and other IDs, memory allocation and other information. The CU maintains a SPR set queue for the presently active and some number of presently waiting threads. Said SPR set queue is managed by the TMT scheduler which is partly implemented in hardware to ensure software-configured but at runtime mostly software-independent execution of the CSP data flow model (Roscoe, Occam). An arbitrary number of SPR sets—one per thread—are kept in a backup SPR block in raw interleaved memory (190); over the CU's parallel ports SPR sets can be saved to and restored from said SPR backup block.

Along with the SPR set queue, the TMT scheduler also prepares the waiting threads by allocating/preloading their pipelined memory blocks (194) from their backup positions into fast access/low latency M1 SPM, accordingly adjusting the relevant pointers in their SPR sets. Similarly, M1 stack segments are allocated and preloaded.

Now when allocating such temporary M1 memory blocks during runtime, said blocks can be aligned in such a way that only local DMA-operated internal memory ports (FIG. 5) are needed for M1 pre- and offloading. In that case, the latter TMT activities do not compete with software M1 stack and pipelined memory accesses—which use a different port set (FIG. 5)—and hence can be performed as a parallel background hardware activity (provided that enough M1 capacity is available and the thread switching frequencies are not "too high").

Accordingly, the TMT scheduler can always maintain a certain number of threads waiting in the "ready to run in M1 mode" state in which their M1 blocks are preloaded. M1 blocks can be configured to performance needs. In principle, threads could also be completely—or temporarily—executed out of M2, M2 or M4 (DRAM) without being subject to M1 pre/offload.

At runtime, thread switches only require altering a thread pointer (TP) that selects which element of the SPR set queue—i.e. which thread—will be executed in the next cycle. Accordingly, in the intended standard use case of "low thread switching frequencies", TMT operates with zero-cycle thread switches which allows the above-mentioned fine-grained latency hiding by thread switching in cases of a CU stall where, as long as the stall lasts, the CU (71) issues VLIWs of other threads to the PPC set (72).

In this context, as usual in CSP implementations (Roscoe, Occam), CU stalls caused by a stalling inter-thread channel cause the TMT scheduler to deschedule the stalling thread. Then, SPR set and M1 memory blocks occupied by said thread can—but need not to—be offloaded, i.e. written back to their original backup allocations, waiting there until the thread is reloaded and made ready for its next execution round.

Thereby, the TMT scheduler manages M1 as a queue for the pipelined memory blocks and topmost stack segments of the active and the waiting threads which it selects according to the CSP data flow execution scheme by availability of communicated data packets and priority. This activity is supported by an additional address decoding mechanism which presents the M1 SPM to the software as (virtually) infinite memory which is mapped to the finite M1 memory volume by a modulo operation thus allowing for temporary M1 memory allocation blocks which "wrap" at the M1 boundaries making optimal use of the available M1 memory space.

As all stack and pipelined memory accesses are managed by virtualization layers (191, 193), the above-described physical M1 memory allocation and loading/offloading activity of the TMT scheduler is invisible to the operating system, middleware, and all software layers which access said memory types per relative addresses, namely stack addresses and latches which—at the runtime of each thread—always point to the same physical data, regardless of actual physical data location. This mechanism was hinted above when claiming a "memory virtualization technique which replaces the energy and chip area intensive data lookup circuitry found in today's caches". The only explicit activity required to be executed by the software, in this context, is to load often-used heap data (190) onto the stack (194)—where it remains accessible via powerful pointer operators (PAT2) but at minimum latency (PA T1)—and offload it after use. In principle, said activity could be eliminated by re-introducing cache-type memory elements which, if desired, requires consideration regarding area/energy overhead versus application-dependent performance improvement.

Figure 30:
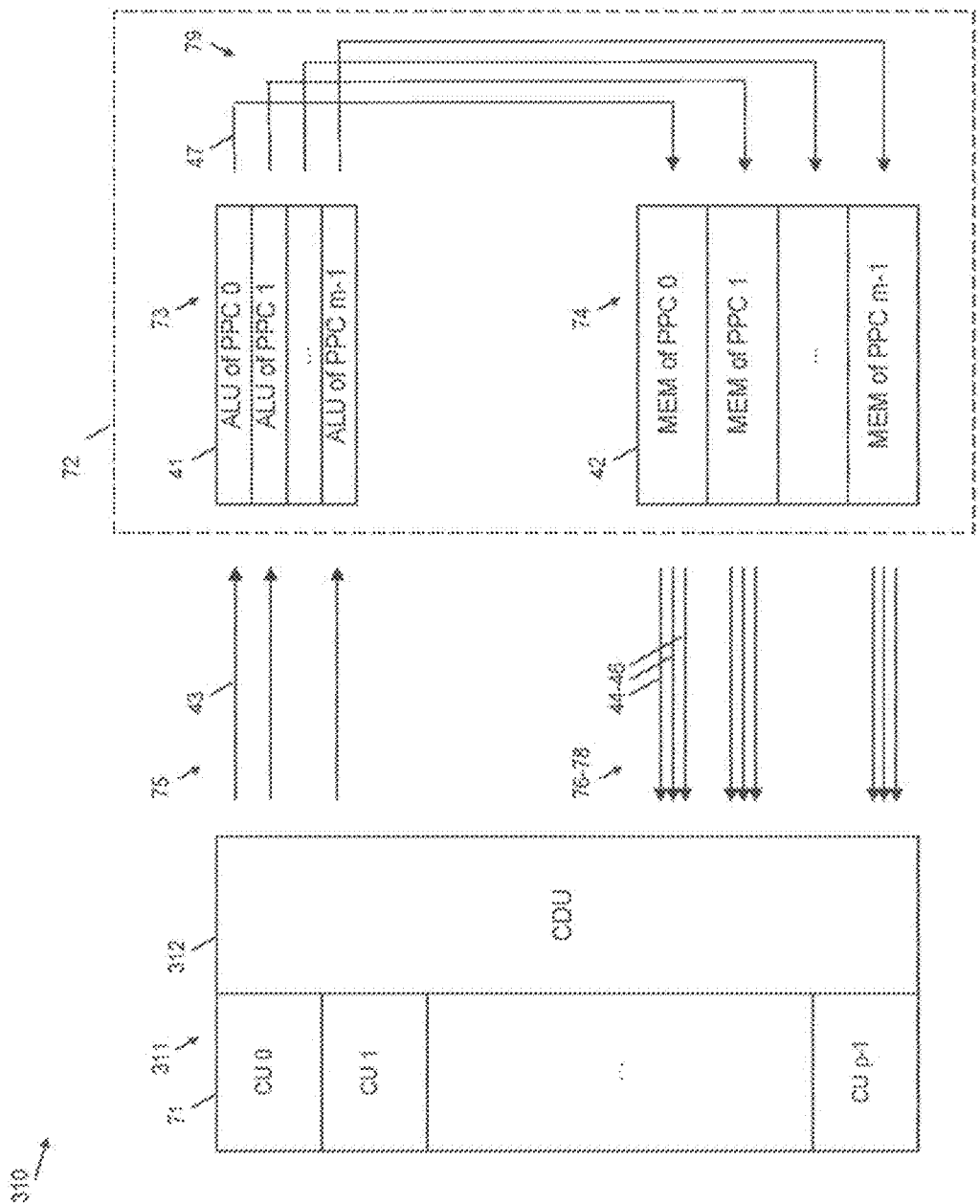
FIG. 30: Simultaneous Multithreading (SMT) on IP cores
Figure 31:
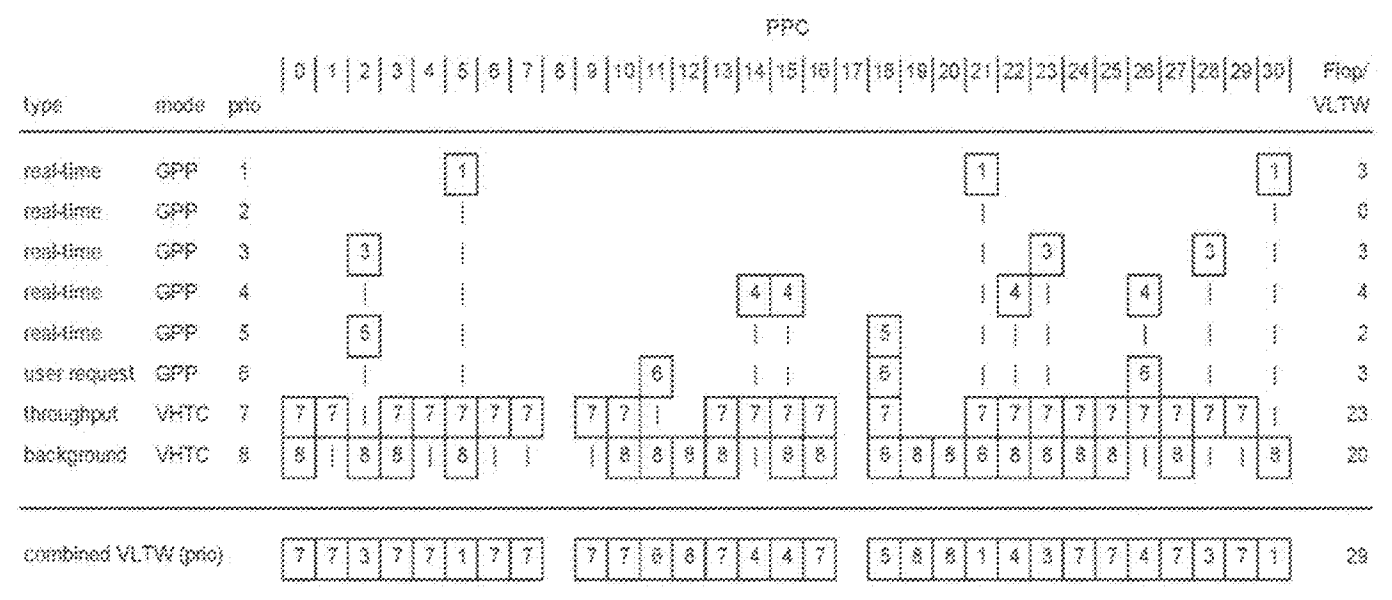

On top of the above-described TMT, "simultaneous multithreading" (SMT) can, as shown in FIG. 30, be performed by a set (311) of control units (71) which parallelly process p threads but share read (76-78) and write ports (75) via a "control dispatch unit" (CDU) (312). According to thread priority, said CDU grants the p CUs (71) read access and combines instructions of the p VLTWs issued by the p CUs (71) into one single VLTW. It does so in a prioritized way on a per-PPC basis by "filling in gaps" as exemplified in FIG. 31. Notably:

The illustrated SMT method guarantees that the highest priority non-empty VLTW will always fully execute.

Flop/VLTW densities of (latency bound) GPP threads are limited by available ILP and expected to be low (in practice, superscalar von Neumann processors seldom achieve an ILP above 2). GPP ILP can be increased by increasing block lengths via predicated processing of conditional constructs (this is a known technique).

There may be cycles in which a GPP thread issues no VLTW ("empty VLTW", in FIG. 30 exemplified in the priority 2 VLTW). This can be understood by example of FIG. 17: In GPP mode, for the duration of the sqrt calculation no instruction can be issued. Also, conditional branching will produce empty VLTWs (note that the architecture proposed by the invention does not need to rely on branch prediction: conditional branches are "waited out").

For VHTC threads, SMT does not conflict with memory pipelining as each VHTC thread maintains an independent pipelined memory block and loop counter i which is incremented upon completion of a loop iteration—regardless how many cycles said iteration takes.

According to the invention, software is understood as a parallel net of sequential threads—i.e. processes that sequentially execute VLIWs—which obey the "communicating sequential processes" (CSP) paradigm (Roscoe). Like in transputer technology (Occam), CSP is a foundational building principle of the ISA. This means that channel communication and other OS primitives related to parallel processing are implemented as machine instructions which according to the invention comply with contemporary message passing interface (MPI) technology.

Now, most of the relevant computer workloads execute repetitive work which is typically organized in the form of loops. Sometimes, such loops can comprise complex control structures and hierarchical levels of nested subroutine calls which at the lower levels might reach into the middleware and operating system realm. It is shown by the next step of the invention how any loop can be deconstructed in a way that it can be executed by a distributed network of IP pipelines which is called an "IP superpipeline".

At first again reconsidering the example of FIG. 17, its square root ("sqrt") operator could in principle be implemented by a subroutine which performs the square root calculation by iteration; according to the invention, such an iteration can be executed by a conditional IP pipeline.

Figure 26:
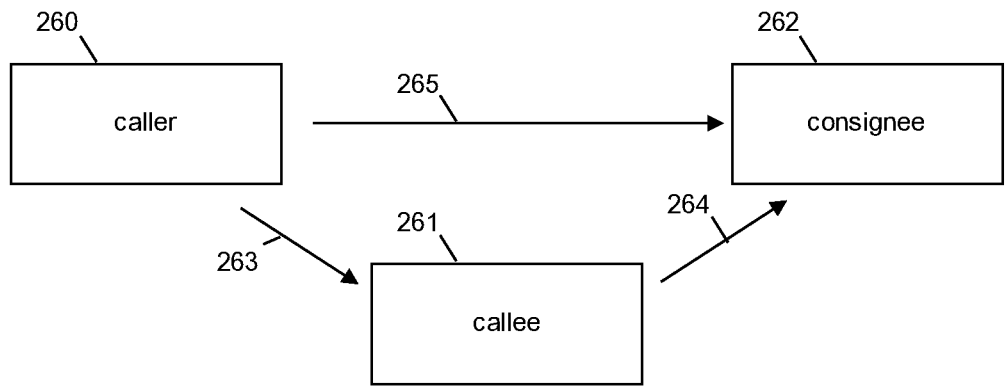
FIG. 26: IP superpipeline of a parallel subroutine call

FIG. 26 shows a channel layout for the operation of said "sqrt pipeline". Avoiding deadlocks, the IP pipeline shown in FIG. 17 is split in a "caller" (260, stages 0-15) and a "consignee" of the sqrt call (262, stages 37-56). Channels (263-265) are buffered. For systolic operation, the buffer pipeline of lane 3 is shortened to latches 24-31 and the buffer pipeline of lane 0 to latches 69-80. Both lanes are sent from the caller (260) to the consignee (262) via channel (265). Also, the caller sends its lane 1 data via channel (262) to the callee (261) which on its part sends the computed sqrt results to the consignee (262).

The caller-callee channel (263) is fixed but as the callee is a subroutine—which in principle could be called by other callers as well—its output channel must be dynamically vectorized as it might have to deliver the results to consignees which are not known at compile time. To do so, the SM which operates the caller's IP pipeline opens the call via a CALL sent to the callee and transmits dynamic channel (264) configuration regarding the targeted consignee per LINK (FIG. 23). After the callee has accordingly established the required dynamic channel configuration with the consignee it sends an ACK to the caller which ensuingly starts its IP pipeline.

The callee's pipeline, while responding to the callers connection request, triggers the exception handlers required to dynamically configure its output channels and then processes the caller's data delivering its sqrt results to the consignee. During call execution, the callee encodes the caller' ID and call number in its WL (cf. FIG. 23). The callee's CWR operator accordingly vectorizes its output to the configured proper consignee channel (264).

Finally, the caller closes the call per RET which is answered by ACK.

The above-discussed FIG. 26 shows a simple IP superpipelining example which outlines a method how to recursively deconstruct a non-elementary algorithmic loop which has a hierarchical control structure that consists of nested subroutine calls but has no conditional constructs (for or while loop, if-else or switch statements etc.). The resulting IP superpipeline is a net of IP pipelines which communicate via CSP channels; each IP pipeline is operated by a GPP stack machine which is run in a parallel thread.

The above-hinted recursion method can also be applied to inner loops of a non-elementary loop. Again regarding FIG. 17, instead of the above-discussed subroutine call, the sqrt operator could alternatively have been algorithmically specified by a while-loop comprised in the DFG of FIG. 16. In this case factoring out and externalizing said while-loop as a "private" subroutine, the decomposition would in principle again lead to the plot of FIG. 26, the only distinction consisting in the fact that for said "private" subroutine no dynamic channel configuration (CALL, LINK, RET, ACK)

is needed as now the callee-to-consignee channel is known at compile time and hence can be configured as a fixed CSP channel.

Figure 27:
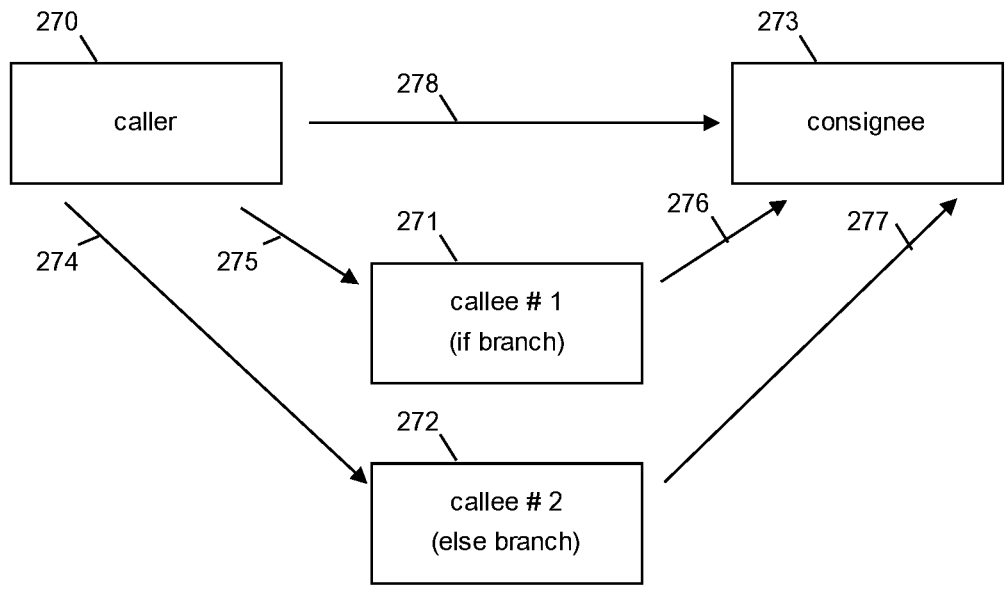
FIG. 27: IP superpipeline of a parallel if-else statement
Figure 28:
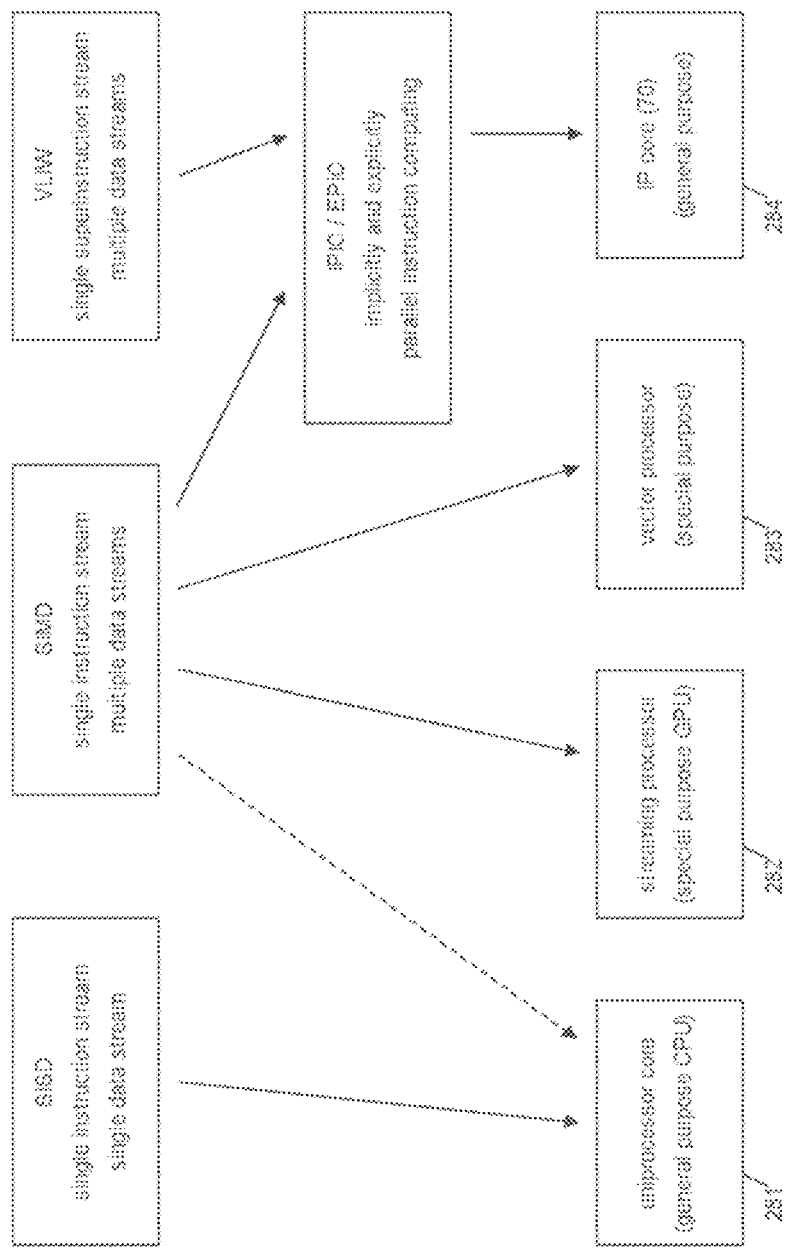
FIG. 28: Technological classification according to Flynn's taxonomy

FIG. 27 illustrates how the conditional if-else structure shown in FIG. 25 translates when compiling the above-mentioned CDFGs as IP pipelines (271, 271) which are used as "private" subroutines. This scheme can be generalized to cover nested conditional structures and switch statements; one possible method that can be applied in the latter cases is, as already mentioned, splitting the statement in a (predicated) prelude that calculates an execution index and a follow-up consisting of a vectorized call to a set of indexed conditional branch pipelines (271, 272, . . . ).

With this final step, the recursive deconstruction method is complete and can be applied to any outer loop which—organized as IP superpipeline—can be distributed over a network of IP cores, levelling out and optimizing core and processor loads to achieve the best possible VHTC performance. On the software layer, the "placement" of the individual pipelines on cores and processors is invisible; it is configured at the start of the software but can be altered at runtime which is useful for dynamic workload balancing.

At the topmost level, a task will always start in sequential von Neumann GPP stack machine mode as one initial thread. The above recursive loop deconstruction method is optional and may, according to the invention, be applied for at most one outer loop which is comprised in said initial thread; this limitation to "one loop only" is not necessary but a design choice which simplifies memory management (at most one pipelined memory allocation per thread). If several outer loops are selected for deconstruction in said initial thread then the initial thread needs to be decomposed into several communicating threads (cf. the caller-consignee setup of FIG. 26, 27) of which each comprises at most one loop selected for deconstruction.

Notably, in each step, the above-explained recursive deconstruction method creates new threads, for each of which an independent decision can be made whether to process its input control/data in sequential GPP or in parallel VHTC pipeline mode (referring back, the same is true for the example stated in FIG. 16). This freedom of choice allows the compiler to tune the code of each such thread according to workload's characteristics in terms of a trade-off between throughput, latency, energy consumption and memory requirements:

Applications of the invention thus are expected to in practice consist of a balanced mixture of GPP, SIMD, and VHTC which also has implications regarding IP core hardware design:

IP cores designed for throughput-oriented "number crunching" applications in which latency is less important are expected to have large M1 to accommodate for large (and many) pipelined memory blocks which sustain VHTC. Due to the large M1 latency, such cores will underperform when operated under real-time conditions in GPP mode, especially if compared to traditional register machine cores (as registers have very low latencies).

On the other hand, IP cores designed for real-time processing workloads will have very small M1 SPM, possibly reaching down to the size of typical register files. In such cores, the TMT will allocate its temporary pipelined memory blocks in M2 SPM but not—as discussed above—in M1. As pipelined VHTC processing is almost insensitive to buffer latency, this measure will only slightly degrade VHTC while yielding good GPP real-time performance.

The latter IP core type is expected to be found in industrial applications with artificial intelligence aspects, the former rather in the data center.

The invention claimed is:

1. A programmable data processing apparatus, comprising a combined data processing and storage unit comprising
    a data processing unit comprising at least one arithmetic logic unit capable of executing data-transforming operations specified by an instruction set architecture of the apparatus, including at least one of arithmetic, logic, or other foundational data-transforming operations on data of all data types supported by the apparatus as per the instruction set architecture of the apparatus, and
    a storage unit for storing data and code pertaining to said operations, wherein at least one part of a memory of the storage unit comprises a parallel memory that includes at least one plurality of memory systems wherein, the memory systems of the plurality are random access memory systems, and jointly provide at least one unified memory address space of the plurality which is accessible through the instruction set architecture of the apparatus, and in which accesses to said plurality can be executed at memory addresses of said unified memory address space, and
    a programmable control unit for executing further operations specified by the instruction set architecture, including at least one of a pointer dereference, data fetch, data store, comparison, instruction fetch, decode, dispatch or branch,
    the control unit being adapted to, under control by code fetched from the storage unit in at least one operational mode of the apparatus, fetch operand data from the parallel memory of the storage unit and to control the data processing unit by specifying at least one of the data-transforming operations to be performed, the operand data to be processed by said data-transforming operations, and destination addresses for results of said data-transforming operations,
    characterized in that
    the apparatus is configured to, in at least one operational mode, execute a parallel random access to the parallel memory comprising at least one plurality of accesses to the parallel memory executed in parallel, wherein per each access individually, as per the instruction set architecture of the apparatus, a memory system of the parallel memory and a memory address located within said memory system are selected, said selection defining the memory access location for the execution of the data access.

2. The apparatus of claim 1, wherein the data transforming operations include at least one transaction which causes the arithmetic logic unit to write the value of at least one operand directly to the parallel memory of the storage unit.

3. The apparatus of claim 1, wherein at least one arithmetic logic unit of the at least one arithmetic logic unit is connected to a port of the control unit.

4. The apparatus of claim 1, wherein at least one memory system of the parallel memory is connected to at least one arithmetic logic unit of the at least one arithmetic logic unit via at least one port.

5. The apparatus of claim 1, wherein at least one memory system of the parallel memory is partitioned into a set of memory subsystems.

6. The apparatus of claim 1, wherein at least one memory system of the parallel memory is further adapted to exchange data with at least one of an external data source or data sink.

7. The apparatus of claim 1, wherein the control unit is further connected to at least one memory system of the parallel memory via at least one data port.

8. The apparatus of claim 1, wherein the control unit, by means of an interleaved memory abstraction layer, is adapted to access the parallel memory as interleaved logical memory such that any interleaved logical memory address uniquely specifies a memory system of the parallel memory and an address for the memory access within said specified memory system.

9. The apparatus of claim 8, wherein the control unit comprises an address decoder implementing the interleaved memory abstraction layer.

10. The apparatus of claim 1, wherein the apparatus is configured to, in at least one operational mode of the apparatus, write the at least one result of the data-transforming operations directly to at least one destination address within one of the memory systems of the parallel memory.

11. The apparatus of claim 1, wherein, in at least one operational mode of the apparatus, the data processing unit is adapted to execute at least one very long transaction word comprising a set of parallel transactions issued by the control unit to the data processing unit, each transaction specifying at least one of at least one data-transforming operation to be performed, at least one operand data to be processed by the at least one data-transforming operation, and at least one destination address in the parallel memory of the apparatus for results of the at least one data-transforming operation.

12. The apparatus of claim 1, wherein a total number of memory systems of the parallel memory is prime.

13. A method of using the apparatus of claim 8, wherein by means of a further pipelined memory abstraction layer, at least one virtual data flow is generated, each virtual data flow being controlled by an address transformation defined within a memory block allocated from the interleaved logical memory forming a pipeline such that an index associated with the pipeline is either subtracted from or added to a relative address located within the pipeline, the address transformation yielding a latch address.

14. The method of claim 13, wherein a modulo operation is further included in said address transformation.

15. The method of claim 13, wherein in at least one operational mode of the apparatus, said latch address is used, as per the instruction set architecture of the apparatus, to specify a memory address for the parallel random access to the parallel memory.

16. The method of claim 13, wherein the pipeline is associated with at least one software loop for either incrementing or decrementing the index associated with the pipeline.

17. The method of claim 13, wherein the pipeline is executed by a dedicated thread.

18. The method of claim 13, wherein multiple pipelines communicate with one another.

19. The method of claim 18, wherein the communicating pipelines form a network.

20. The method of claim 13, wherein control flow information is embedded into data streams processed by or communicated between pipelines.

21. The method of claim 20, wherein the control flow information is embedded into a one of the data streams by augmenting each data word of said one of the data streams by a control tag, each augmented data word being stored, processed and communicated as a whole, and the control tag comprising a combination of bits including at least one of a bit controlling loop termination, a bit controlling conditional execution of operations on the augmented data word, and a bit indicating that the data word contains further control information.

22. The method of claim 13, wherein said pipeline is used as an addressable stack of data referenced relatively to a top of said stack, said address transformation yielding a virtual register address.

23. The method of claim 13, wherein address decoder hardware is used to translate latch addresses to logical addresses.

* * * * *